(12) United States Patent
Sugita et al.

(10) Patent No.: US 12,487,406 B2
(45) Date of Patent: Dec. 2, 2025

(54) ISOLATOR, OPTICAL SWITCH, OPTICAL TRANSMITTER AND RECEIVER, DATA CENTER, AND ISOLATOR MANUFACTURING METHOD

(71) Applicant: KYOCERA Corporation, Kyoto (JP)

(72) Inventors: Tomoya Sugita, Machida (JP); Reona Motoji, Tokyo (JP); Dan Maeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/571,917

(22) PCT Filed: Aug. 7, 2023

(86) PCT No.: PCT/JP2023/028829
§ 371 (c)(1),
(2) Date: Dec. 19, 2023

(87) PCT Pub. No.: WO2024/247290
PCT Pub. Date: Dec. 5, 2024

(65) Prior Publication Data
US 2025/0093583 A1 Mar. 20, 2025

(30) Foreign Application Priority Data
Jun. 1, 2023 (JP) ................. 2023-090913

(51) Int. Cl.
*G02B 6/26* (2006.01)
*G02B 6/27* (2006.01)
(Continued)

(52) U.S. Cl.
CPC ........... *G02B 6/2746* (2013.01); *G02B 6/264* (2013.01); *G02F 1/0955* (2013.01); *G02B 2006/12157* (2013.01)

(58) Field of Classification Search
CPC .................. G02B 6/264; G02B 6/2746; G02B 2006/12157; G02F 1/0955
See application file for complete search history.

(56) References Cited

U.S. PATENT DOCUMENTS 7,664,346 B2    2/2010   Mizumoto et al.
2017/0269395 A1  9/2017   Heck et al.
(Continued)

FOREIGN PATENT DOCUMENTS

CN   112596157 A   4/2021
JP   S59-074526 A  4/1984
(Continued)

OTHER PUBLICATIONS

Ghosh et al., "Ce: YIG/Silicon-on-Insulator waveguide optical isolator realized by adhesive bonding", vol. 20, No. 2/Optics Express, Jan. 16, 2012, pp. 1839-1848.
(Continued)

*Primary Examiner* — Ryan A Lepisto
(74) *Attorney, Agent, or Firm* — Procopio, Cory, Hargreaves & Savitch LLP

(57) ABSTRACT

An isolator includes a substrate, a waveguide, an insulating layer, and a non-reciprocity member. The insulating layer includes a recess. The recess overlaps at least part of the waveguide. The non-reciprocity member is positioned in the recess. The waveguide includes a first waveguide and a second waveguide. The recess includes a first recess and a second recess. The non-reciprocity member includes a first non-reciprocity member positioned in the first recess and a second non-reciprocity member positioned in the second recess. A propagation direction of the electromagnetic wave in a portion of the first waveguide, the portion overlapping the first non-reciprocity member, and a propagation direction of the electromagnetic wave in a portion of the second (Continued)

waveguide, the portion overlapping the second non-reciprocity member, are different from each other.

16 Claims, 17 Drawing Sheets

(51) Int. Cl.
*G02F 1/095* (2006.01)
*G02B 6/12* (2006.01)

(56) References Cited

U.S. PATENT DOCUMENTS

| | | |
|---|---|---|
| 2018/0031873 A1 | 2/2018 | Kim et al. |
| 2021/0349191 A1 | 11/2021 | Bi et al. |
| 2023/0288633 A1* | 9/2023 | Sugita ............... G02F 1/0955 |
| 2023/0324727 A1* | 10/2023 | Goto ................ G02F 1/0955 |
| | | 385/1 |

FOREIGN PATENT DOCUMENTS

| | | |
|---|---|---|
| JP | 2004-240003 A | 8/2004 |
| JP | 2015-169833 A | 9/2015 |
| JP | 2021-021832 A | 2/2021 |
| JP | 2022-182107 A | 12/2022 |
| WO | 2007/083419 A1 | 7/2007 |

OTHER PUBLICATIONS

Yan et al., "On-Chip Nonreciprocal Photonic Devices Based on Hybrid Integration of Magneto-Optical Garnet Thin Films on Silicon", IEEE Journal Of Selected Topics In Quantum Electronics, vol. 28, No. 3, May/Jun. 2022, 6100515, 15 pages, 1077-260X.

* cited by examiner

FIG. 9
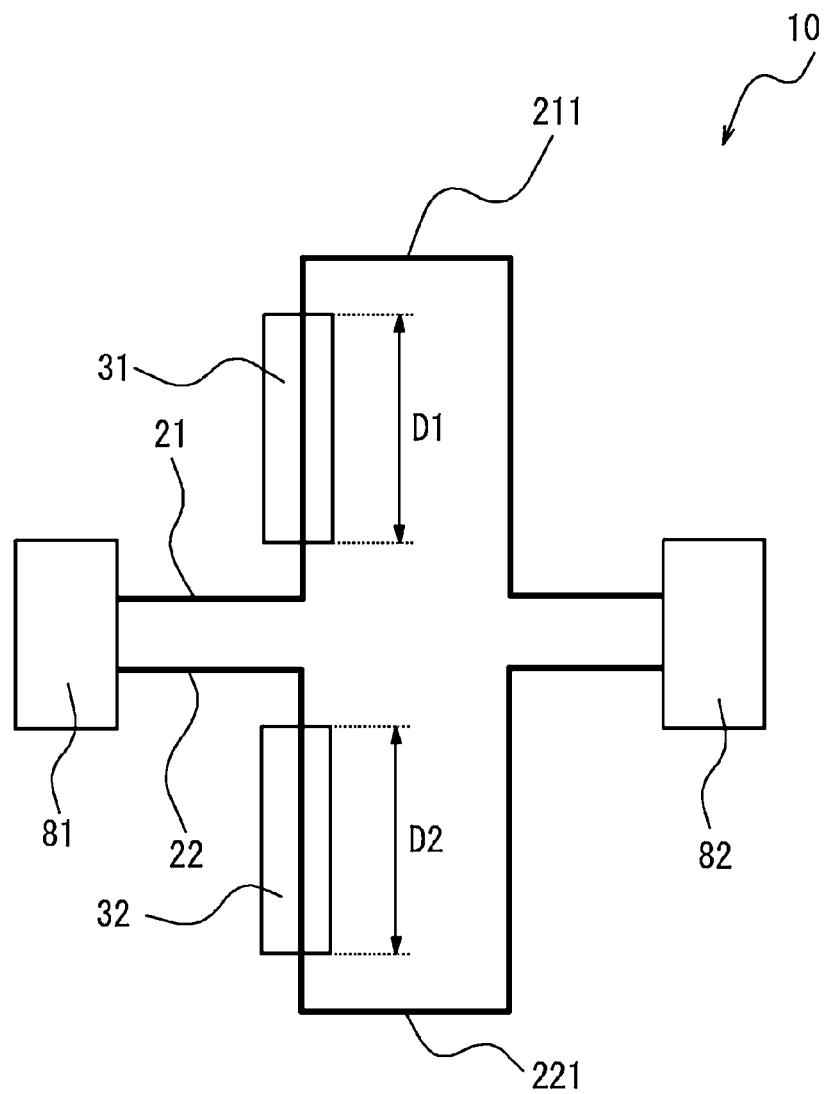
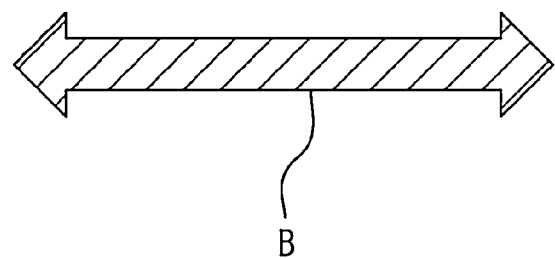

FIG. 10
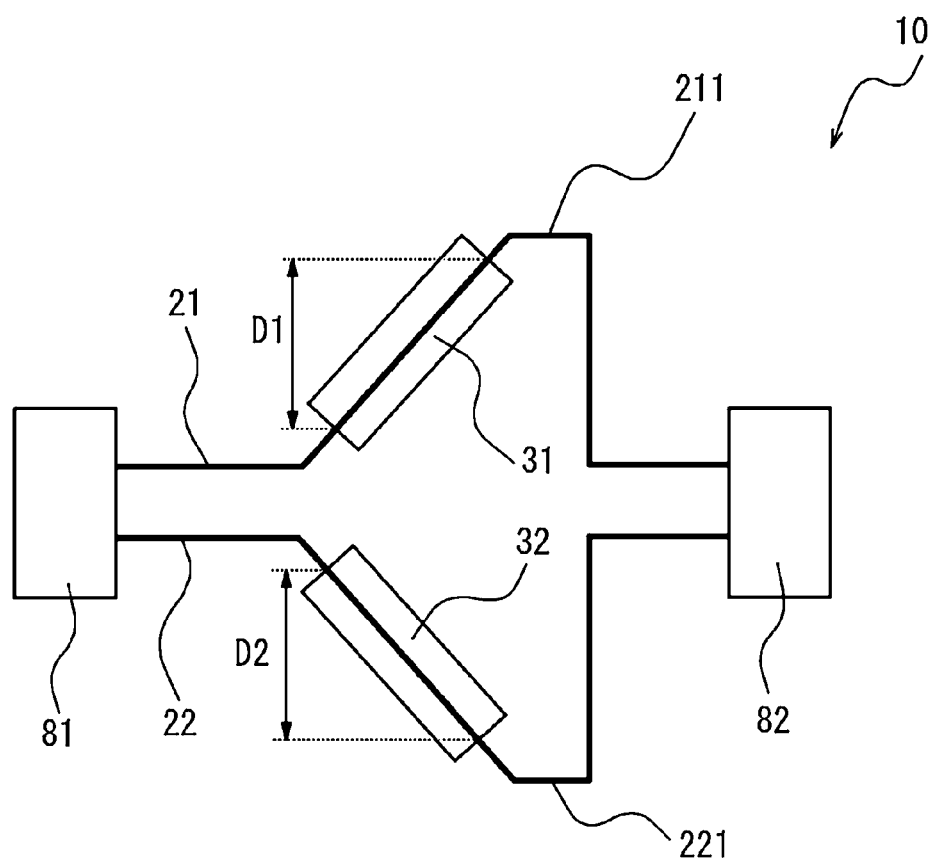
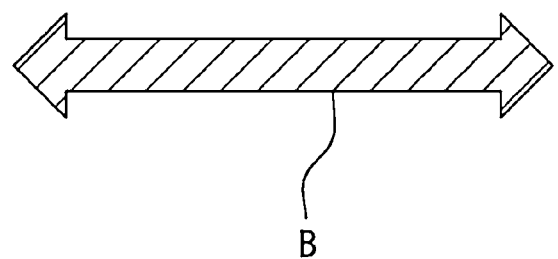

FIG. 12
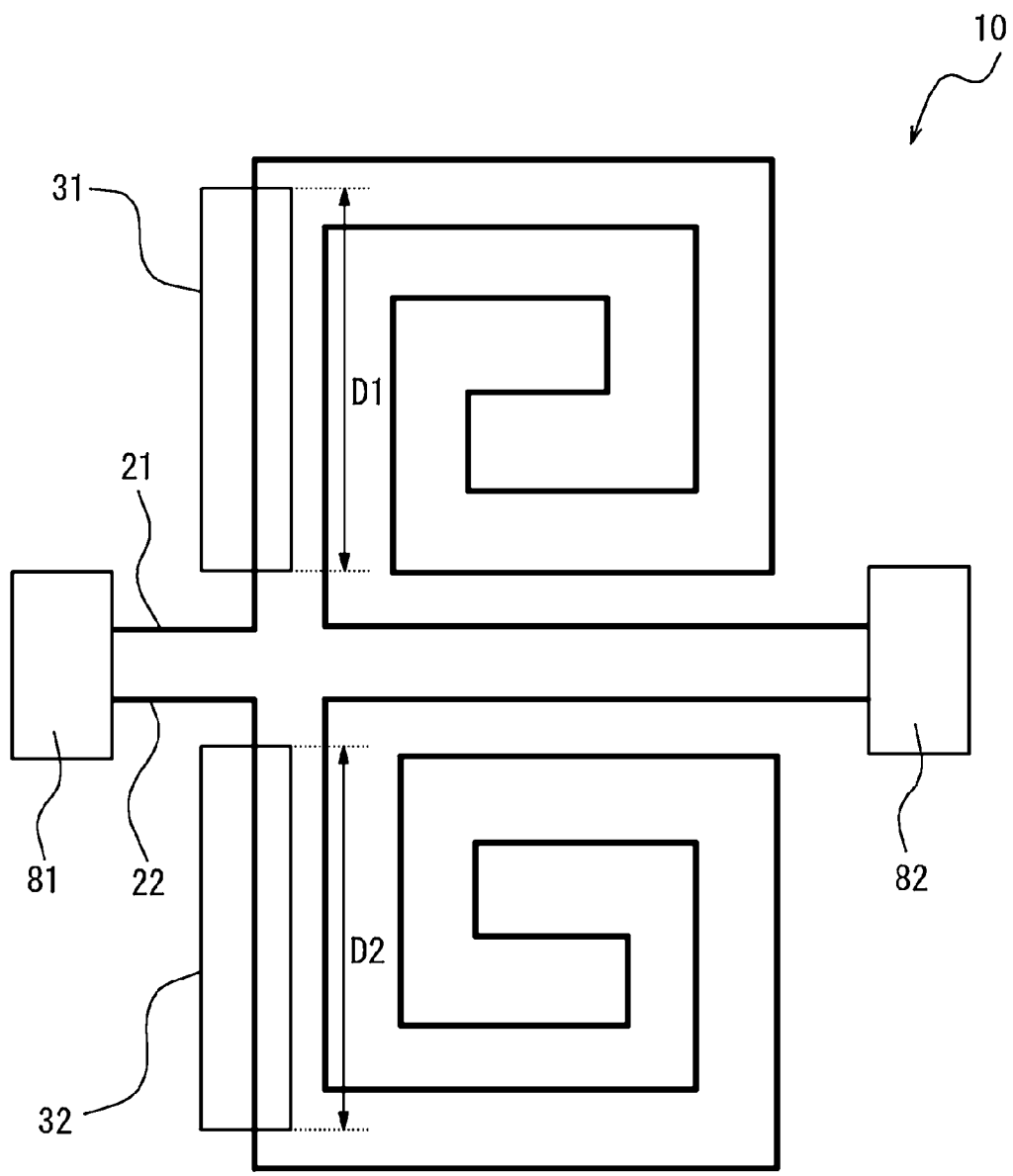
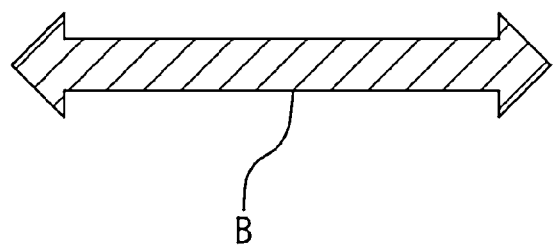

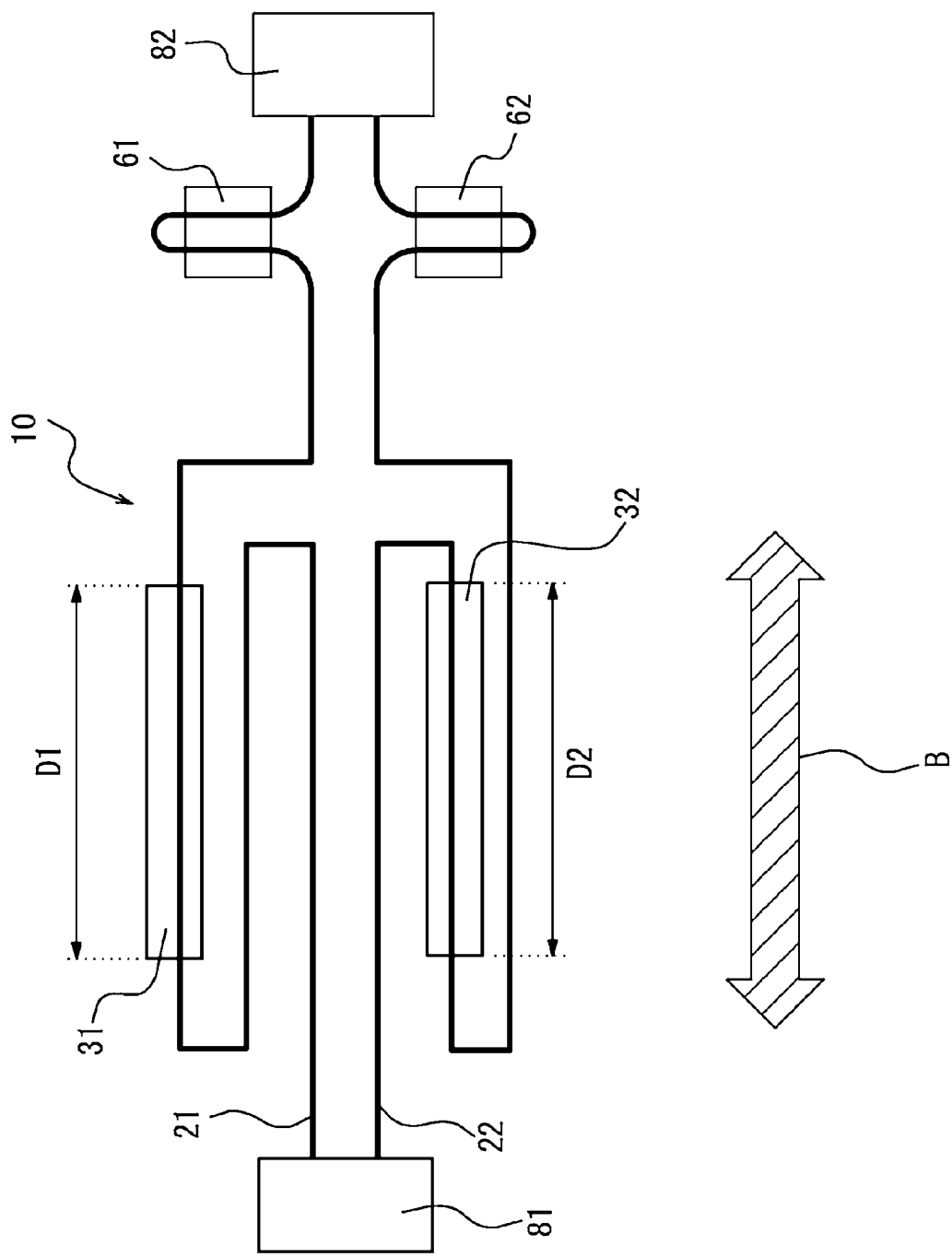

ISOLATOR, OPTICAL SWITCH, OPTICAL TRANSMITTER AND RECEIVER, DATA CENTER, AND ISOLATOR MANUFACTURING METHOD

CROSS-REFERENCE TO RELATED APPLICATIONS

This application claims priority of Japanese Patent Application No. 2023-90913 (filed Jun. 1, 2023), the content of which is incorporated herein for reference in its entirety.

TECHNICAL FIELD

The present disclosure relates to an isolator, an optical switch, an optical transmitter and receiver, a data center, and an isolator manufacturing method.

BACKGROUND OF INVENTION

A known example of an optical isolator uses a magneto-optical material Ce:YIG (cerium-substituted yttrium iron garnet) as a waveguide layer (see, for example, Patent Literature 1).

Citation List

Patent Literature

Patent Literature 1: International Publication No. 2007/083419

SUMMARY

An embodiment of the present disclosure provides an isolator including a substrate with a substrate surface, a first waveguide, a second waveguide, an insulating layer, a first non-reciprocity member, and a second non-reciprocity member. Each of the first waveguide and the second waveguide extends on the substrate surface and causes an electromagnetic wave in a TM (transverse magnetic) mode to propagate therethrough along an extension direction. The insulating layer is positioned on the substrate surface and surrounds at least part of each of the first waveguide and the second waveguide. The insulating layer has a surface positioned at an upper level than upper surfaces of the first waveguide and the second waveguide and includes a first recess and a second recess. The first recess is defined by a bottom surface positioned at a lower level than the surface of the insulating layer and by side surfaces positioned between the bottom surface and the surface of the insulating layer and overlaps at least part of the first waveguide in a plan view of the substrate surface. The second recess is defined by a bottom surface positioned at a lower level than the surface of the insulating layer and by side surfaces positioned between the bottom surface and the surface of the insulating layer and overlaps at least part of the second waveguide in the plan view of the substrate surface. The first non-reciprocity member is positioned on the bottom surface of the first recess and overlaps at least part of the first waveguide in the plan view of the substrate surface. The second non-reciprocity member is positioned on the bottom surface of the second recess and overlaps at least part of the second waveguide in the plan view of the substrate surface. A propagation direction of the electromagnetic wave in a portion of the first waveguide, the portion overlapping the first non-reciprocity member in the plan view of the substrate surface, and a propagation direction of the electromagnetic wave in a portion of the second waveguide, the portion overlapping the second non-reciprocity member in the plan view of the substrate surface, are different from each other.

An embodiment of the present disclosure provides an optical switch including the isolator described above.

An embodiment of the present disclosure provides an optical transmitter and receiver including the isolator described above and a light source optically connected to the isolator.

An embodiment of the present disclosure provides a data center configured to perform communication by a device including the isolator described above.

An embodiment of the present disclosure provides an isolator manufacturing method including forming, on a substrate, a first waveguide and a second waveguide through each of which an electromagnetic wave in a TM mode propagates. The isolator manufacturing method includes forming an insulating layer on the first waveguide and the second waveguide. The isolator manufacturing method includes etching the insulating layer and forming a first recess overlapping at least a portion of the first waveguide and a second recess overlapping at least a portion of the second waveguide. The first recess and the second recess are formed such that a propagation direction of the electromagnetic wave in the portion of the first waveguide overlapping the first recess and a propagation direction of the electromagnetic wave in the portion of the second waveguide overlapping the second recess are different from each other. The isolator manufacturing method includes forming a first non-reciprocity member on a bottom surface of the first recess and forming a second non-reciprocity member on a bottom surface of the second recess. The isolator manufacturing method includes irradiating the first non-reciprocity member and the second non-reciprocity member with laser light.

BRIEF DESCRIPTION OF THE DRAWINGS

FIG. 9 is a plan view illustrating an example of a configuration in which an extension direction of each of a first recess and a second recess is orthogonal to a direction toward a second branch portion from a first branch portion.

FIG. 10 is a plan view illustrating an example of a configuration in which the extension direction of the first recess and the extension direction of the second recess intersect.

FIG. 12 is a plan view illustrating an example of a configuration in which the waveguides each have a spiral shape when a magnetic field is applied in the direction interconnecting the first branch portion and the second branch portion.

FIG. 17 is a plan view illustrating an example of a configuration of an isolator further including a heater

DESCRIPTION OF EMBODIMENTS

When an isolator using YIG as a waveguide layer is formed on a semiconductor substrate, reduction in an influence of YIG is required in a semiconductor process. An isolator according to an embodiment of the present disclosure and a method of manufacturing the isolator can reduce the influence of YIG in the semiconductor process.

Example of Configuration of Isolator 10

Figure 1:
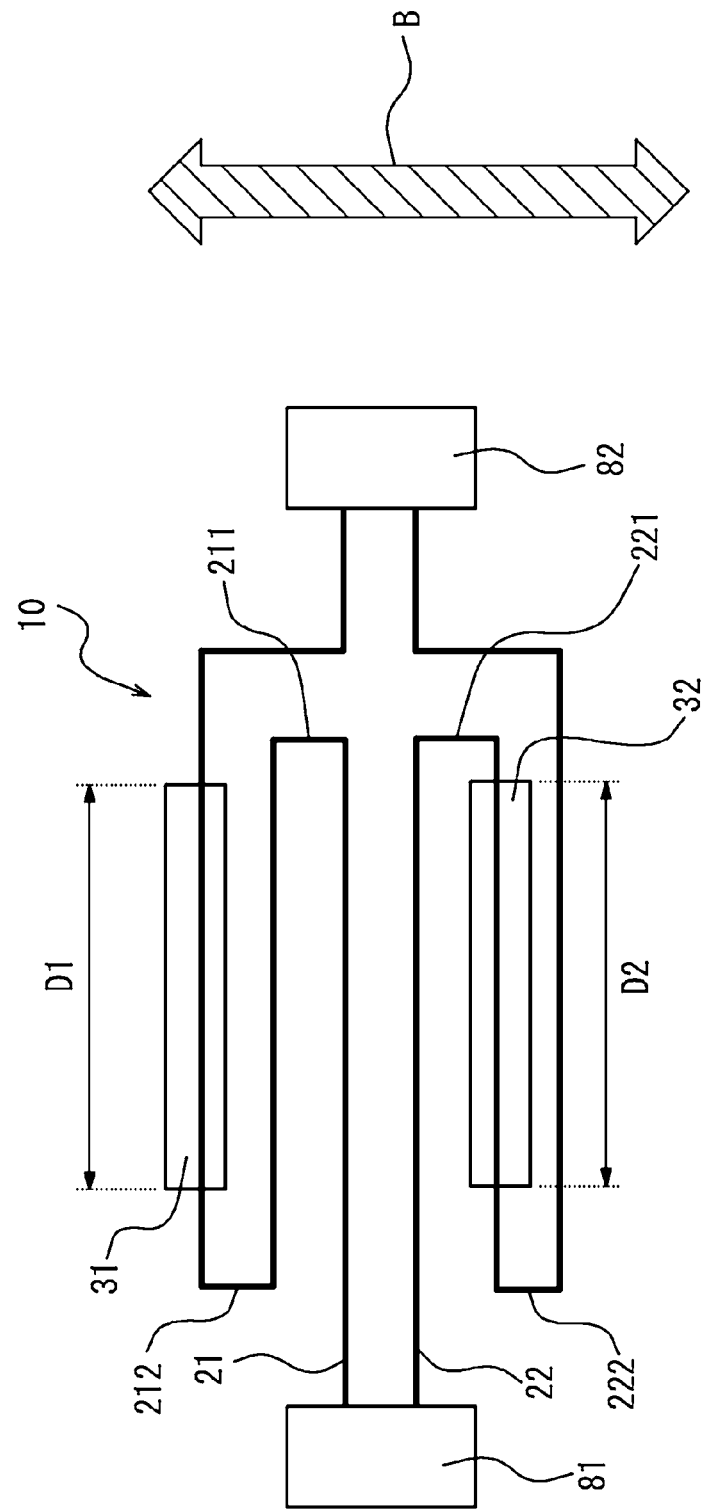
FIG. 1 is a plan view illustrating an example of a configuration of an isolator according to an embodiment.

As illustrated in FIG. 1, according to the embodiment, the isolator 10 includes a first waveguide 21, a second waveguide 22, a first recess 31, a second recess 32, a first branch portion 81, and a second branch portion 82. It is assumed that the isolator 10 is formed on a substrate surface 50A (see FIG. 3) of a substrate 50. The first waveguide 21 and the second waveguide 22 each extend on the substrate 50 and cause an electromagnetic wave in a TM mode to propagate therethrough from the first branch portion 81 toward the second branch portion 82.

An extension direction of each of the first waveguide 21 and the second waveguide 22 is changed at one or more positions. In FIG. 1, the extension direction of the first waveguide 21 is changed at two positions, namely at turn-around portions 211 and 212. The extension direction of the second waveguide 22 is changed at two positions, namely at turnaround portions 221 and 222. The extension direction of the waveguide is changed in an opposite direction at each of the turnaround portions 211, 212, 221, and 222. In other words, the extension direction of the waveguide is changed by 180 degrees. An angle by which the extension direction of the waveguide is changed is not limited to 180 degrees and may be 90 degrees or any of various other angles.

The first recess 31 overlaps at least part of the first waveguide 21 in a plan view of the substrate surface 50A. The first recess 31 may extend along the extension direction of the first waveguide 21. A first non-reciprocity member is positioned in the first recess 31.

The second recess 32 overlaps at least part of the second waveguide 22 in the plan view of the substrate surface 50A. The second recess 32 may extend along the extension direction of the second waveguide 22. A second non-reciprocity member is positioned in the second recess 32.

Operation Principle of Isolator 10

The isolator 10 allows the electromagnetic wave in the TM mode, input to the first branch portion 81, to pass through the second branch portion 82 but does not allow the electromagnetic wave in the TM mode, input to the second branch portion 82, to pass through the first branch portion 81 by attenuating the input electromagnetic wave in the first branch portion 81. A direction in which the electromagnetic wave propagates from the first branch portion 81 toward the second branch portion 82 is also referred to as a first direction. A direction in which the electromagnetic wave propagates from the second branch portion 82 toward the first branch portion 81 is also referred to as a second direction. In other words, the isolator 10 allows passage of the electromagnetic wave in the TM mode in the first direction but does not allow passage of the electromagnetic wave in the TM mode in the second direction.

As for the electromagnetic wave in the TM mode, when the electromagnetic wave propagates along the substrate surface 50A of the substrate 50 (see FIG. 3), an amplitude direction of an electric field is aligned with a direction normal to the substrate surface 50A. On the other hand, as for the electromagnetic wave in a TE (transverse electric) mode, when the electromagnetic wave propagates along the substrate surface 50A of the substrate 50 (see FIG. 3), an amplitude direction of an electric field is aligned with a direction that is orthogonal to the propagation direction of the electromagnetic wave and that is along the substrate surface 50A.

The isolator 10 realizes asymmetric propagation characteristics of the electromagnetic wave based on the principle of an asymmetric Mach-Zehnder interferometer. In the isolator 10, of electromagnetic waves propagating from the first branch portion 81 in the first direction after being branched into the first waveguide 21 and the second waveguide 22, a phase of the electromagnetic wave reaching the second branch portion 82 after passing through the first waveguide 21 and a phase of the electromagnetic wave reaching the second branch portion 82 after passing through the second waveguide 22 are in match with each other. In the isolator 10, of electromagnetic waves propagating from the second branch portion 82 in the second direction after being branched into the first waveguide 21 and the second waveguide 22, a phase of the electromagnetic wave reaching the first branch portion 81 after passing through the first waveguide 21 and a phase of the electromagnetic wave reaching the first branch portion 81 after passing through the second waveguide 22 are shifted by 180 degrees. With such a feature, the isolator 10 operates to allow the electromagnetic wave to pass in the first direction but not to allow the electromagnetic wave to pass in the second direction.

A shift of the phase can be adjusted with line lengths of the waveguides and/or effective refractive indexes of the waveguides. The isolator 10 is premised on that, when neither the first non-reciprocity member nor the second non-reciprocity member is present, the phase of the electromagnetic wave propagating through the first waveguide 21 is delayed by 90 degrees from that of the electromagnetic wave propagating through the second waveguide 22 regardless of whether the electromagnetic wave propagate through the isolator 10 in the first direction or the second direction. Thus, a way in which the phase of the electromagnetic wave propagating in the first direction shifts and a way in which the phase of the electromagnetic wave propagating in the second direction shifts are the same even with simple setting for the line lengths of the waveguides or the effective refractive indexes of the waveguides.

In view of the above point, the isolator 10 includes the first non-reciprocity member positioned along at least part of the first waveguide 21 and the second non-reciprocity member positioned along at least part of the second waveguide 22 to make the shift of the phase of the electromagnetic wave propagating through the waveguide in the first direction and the shift of the phase of the electromagnetic wave propagating through the waveguide in the second direction different from each other. The first waveguide 21 including the first non-reciprocity member and the second waveguide 22 including the second non-reciprocity member function as non-reciprocity waveguides with application of a magnetic field.

The non-reciprocity waveguides advance or delay the phases of the propagating electromagnetic waves. In the isolator 10 according to this embodiment, the non-reciprocity waveguides reverse a relation of an advance and a delay of the phase between the waveguides to which the magnetic field is applied from opposite directions when looking in the propagation direction of the electromagnetic wave. It is assumed that, when the magnetic field is applied from the right side when looking in the propagation direction of the electromagnetic wave, the phase of the electromagnetic wave is advanced by 45 degrees, and that, when the magnetic field is applied from the left side when looking in the propagation direction of the electromagnetic wave, the phase of the electromagnetic wave is delayed by 45 degrees. It is also assumed that, in the isolator 10 illustrated in FIG. 1, a magnetic field (B) is applied along an up-down direction, as denoted by arrows, on a drawing sheet on which the isolator 10 is illustrated.

When the electromagnetic wave propagates in the first direction, the propagation direction of the electromagnetic wave is from the left to the right in the first waveguide 21 that overlaps the first non-reciprocity member in the first recess 31. On the other hand, the propagation direction of the electromagnetic wave is from the right to the left in the second waveguide 22 that overlaps the second non-reciprocity member in the second recess 32. Here, when a direction of the magnetic field is from below to above, the magnetic field is applied from the right side when looking in the propagation direction of the electromagnetic wave in the first waveguide 21 that overlaps the first non-reciprocity member in the first recess 31, and the magnetic field is applied from the left side when looking in the propagation direction of the electromagnetic wave in the second waveguide 22 that overlaps the second non-reciprocity member in the second recess 32. Accordingly, the phase of the electromagnetic wave in the first waveguide 21 is advanced by 45 degrees. To the contrary, the phase of the electromagnetic wave in the second waveguide 22 is delayed by 45 degrees. Hence the phase of the electromagnetic wave propagating through the first waveguide 21 in the first direction is advanced by 90 degrees from that of the electromagnetic wave propagating through the second waveguide 22 in the first direction.

Contrary to the above case, when the electromagnetic wave propagates in the second direction, the propagation direction of the electromagnetic wave is from the right to the left in the first waveguide 21 that overlaps the first non-reciprocity member in the first recess 31. On the other hand, the propagation direction of the electromagnetic wave is from the left to the right in the second waveguide 22 that overlaps the second non-reciprocity member in the second recess 32. Here, when the direction of the magnetic field is from below to above, the magnetic field is applied from the left side when looking in the propagation direction of the electromagnetic wave in the first waveguide 21 that overlaps the first non-reciprocity member in the first recess 31, and the magnetic field is applied from the right side when looking in the propagation direction of the electromagnetic wave in the second waveguide 22 that overlaps the second non-reciprocity member in the second recess 32. Accordingly, the phase of the electromagnetic wave in the first waveguide 21 is delayed by 45 degrees. To the contrary, the phase of the electromagnetic wave in the second waveguide 22 is advanced by 45 degrees. Hence the phase of the electromagnetic wave propagating through the first waveguide 21 in the second direction is delayed by 90 degrees from that of the electromagnetic wave propagating through the second waveguide 22 in the second direction.

In the isolator 10, as described above, when neither the first non-reciprocity member nor the second non-reciprocity member is present, the phase of the electromagnetic wave propagating through the first waveguide 21 in the first direction is delayed by 90 degrees from that of the electromagnetic wave propagating through the second waveguide 22 in the first direction.

Because the phase of the electromagnetic wave propagating through the first waveguide 21 is advanced by 90 degrees when the electromagnetic wave propagates in the first direction, a difference between the phase of the electromagnetic wave propagating through the first waveguide 21 and the phase of the electromagnetic wave propagating through the second waveguide 22 becomes 0 degree in the second branch portion 82. As a result, the electromagnetic wave propagating through the first waveguide 21 and the electromagnetic wave propagating through the second waveguide 22 strengthen each other when both the waves are combined in the second branch portion 82, and the combined electromagnetic wave passes through the isolator in the first direction.

Contrary to the above case, because the phase of the electromagnetic wave propagating through the first waveguide 21 is delayed by 90 degrees when the electromagnetic wave propagates in the second direction, a difference between the phase of the electromagnetic wave propagating through the first waveguide 21 and the phase of the electromagnetic wave propagating through the second waveguide 22 becomes 180 degrees in the second branch portion 82. As a result, the electromagnetic wave propagating through the first waveguide 21 and the electromagnetic wave propagating through the second waveguide 22 weaken each other when both the waves are combined in the second branch portion 82, and no electromagnetic wave passes through the isolator in the second direction.

To explain the above configuration in another way, the isolator 10 is constituted such that the propagation direction of the electromagnetic wave in a portion of the first waveguide 21, the portion overlapping the first non-reciprocity member in the plan view of the substrate surface 50A, and the propagation direction of the electromagnetic wave in a portion of the second waveguide 22, the portion overlapping the second non-reciprocity member in the plan view of the substrate surface 50A, are different from each other. With such a configuration of the isolator 10, an advance or a delay of the phase of the electromagnetic wave can be made different between when the electromagnetic wave propagates in the first direction and when the electromagnetic wave propagates in the second direction. As a result, the isolator 10 allows the passage of the electromagnetic wave propagates in the first direction but does not allow the passage of the electromagnetic wave propagates in the second direction.

Effective Length

As illustrated in FIG. 1, the first recess 31 and the second recess 32 may overlap portions of the first waveguide 21 and the second waveguide 22, respectively, the portions extending along a direction toward the second branch portion 82 from the first branch portion 81. A length of the first recess 31 in the extension direction of the first waveguide 21 is expressed by D1. When the first non-reciprocity member is positioned over the entirety of the first recess 31, a length of the first non-reciprocity member overlapping the first waveguide 21 is D1. A length of the second recess 32 in the extension direction of the second waveguide 22 is expressed by D2. When the second non-reciprocity member is positioned over the entirety of the second recess 32, a length of the second non-reciprocity member overlapping the second waveguide 22 is D2.

When a non-reciprocity member 40 overlaps a waveguide 20 in a direction orthogonal to the magnetic field B, the magnitude of developed non-reciprocity is determined depending on an overlap distance. More specifically, as the overlap distance of the non-reciprocity member 40 and the waveguide 20 along the direction orthogonal to the magnetic field B is longer, the magnitude of the non-reciprocity developed by the non-reciprocity member 40 increases. On the other hand, when the non-reciprocity member 40 overlaps the waveguide 20 in a direction inclined from the direction orthogonal to the magnetic field B, the magnitude of the developed non-reciprocity is determined depending on part of the overlap distance, the part corresponding to a component in the direction orthogonal to the magnetic field B. Thus, the distance by which the non-reciprocity member 40 actually overlaps the waveguide 20 and the distance by which the magnitude of the developed non-reciprocity is determined may be different from each other in some cases. The distance by which the magnitude of the developed non-reciprocity is determined is also referred to as an effective length. In FIG. 1, the non-reciprocity member 40 overlaps the waveguide 20 along the direction orthogonal to the magnetic field B. Accordingly, D1 is the effective length of the non-reciprocity waveguide in combination of the first waveguide 21 and the first non-reciprocity member. D2 is the effective length of the non-reciprocity waveguide in combination of the second waveguide 22 and the second non-reciprocity member.

In the isolator 10, the effective length of the non-reciprocity waveguide in combination of the first waveguide 21 and the first non-reciprocity member and the effective length of the non-reciprocity waveguide in combination of the second waveguide 22 and the second non-reciprocity member may be equal to each other. When the recess 30 is divided into multiple parts, a total of the effective lengths in individual parts of the first recess 31 and a total of the effective lengths in individual parts of the second recess 32 may be equal to each other. With the effective lengths being set equal, the phases are easier to adjust. As a result, performance of the isolator 10 can be improved.

<Example of Configuration of Non-Reciprocity Waveguide>

An example of a configuration of the first waveguide 21, the first recess 31, and the first non-reciprocity member and an example of a configurations of the second waveguide 22, the second recess 32, and the second non-reciprocity member, all of which are included in the isolator 10, will be described below with reference to FIGS. 2 and 3. The first waveguide 21 and the second waveguide 22 are each also simply referred to as the waveguide 20 (see FIG. 2) unless there is necessity of discriminating the two waveguides. The first recess 31 and the second recess 32 are each also simply referred to as the recess 30 (see FIG. 2) unless there is necessity of discriminating the two recesses. The first non-reciprocity member and the second non-reciprocity member are each also simply referred to as the non-reciprocity member 40 (see FIG. 2) unless there is necessity of discriminating the two non-reciprocity members.

The isolator 10 is formed on the substrate 50 with the substrate surface 50A. The substrate 50 may include a conductor such as metal, a semiconductor such as silicon, glass, or resin. In this embodiment, the substrate 50 is made of silicon (Si). However, the substrate material is not limited the above example, and various other materials may also be used.

The substrate 50 includes a box layer 52 on the substrate surface 50A. The box layer 52 is made of an insulator such as a silicon oxide film. The waveguide 20 is positioned on the box layer 52. The waveguide 20 has an upper surface 201. The upper surface 201 is positioned on an opposite side to a surface of the waveguide 20 in contact with the box layer 52.

The substrate 50 further includes an insulating layer 54. The insulating layer 54 surrounds at least part of the waveguide 20. The insulating layer 54 is made of an insulator such as a silicon oxide film.

The insulating layer 54 has a surface and includes the recess 30 recessed in the surface. The recess 30 may be formed by etching the insulating layer 54. The recess 30 is defined by side surfaces 301, 302, 303, and 304 and a bottom surface 305. The bottom surface 305 is positioned closer to the substrate surface 50A than the surface of the insulating layer 54, namely on the side lower than the surface of the insulating layer 54. The side surfaces 301, 302, 303, and 304 are positioned between the bottom surface 305 and the surface of the insulating layer 54.

The first recess 31 overlaps at least part of the first waveguide 21. The first recess 31 may extend along the extension direction of the first waveguide 21. The second recess 32 overlaps at least part of the second waveguide 22. The second recess 32 may extend along the extension direction of the second waveguide 22. In other words, the recess 30 overlaps at least part of the waveguide 20. The recess 30 may extend along the extension direction of the waveguide 20. In FIG. 2, the waveguide 20 and the recess 30 extend in an X-axis direction. The side surfaces 301 and 302 are positioned along the X-axis direction in which the waveguide 20 extends. The side surfaces 303 and 304 are positioned along a Y-axis direction intersecting the direction in which the waveguide 20 extends.

The bottom surface 305 of the recess 30 and the upper surface 201 of the waveguide 20 are flush with each other. Stated another way, the upper surface 201 of the waveguide 20 is exposed at the bottom surface 305 of the recess 30 without being covered with the insulating layer 54.

Figure 4:
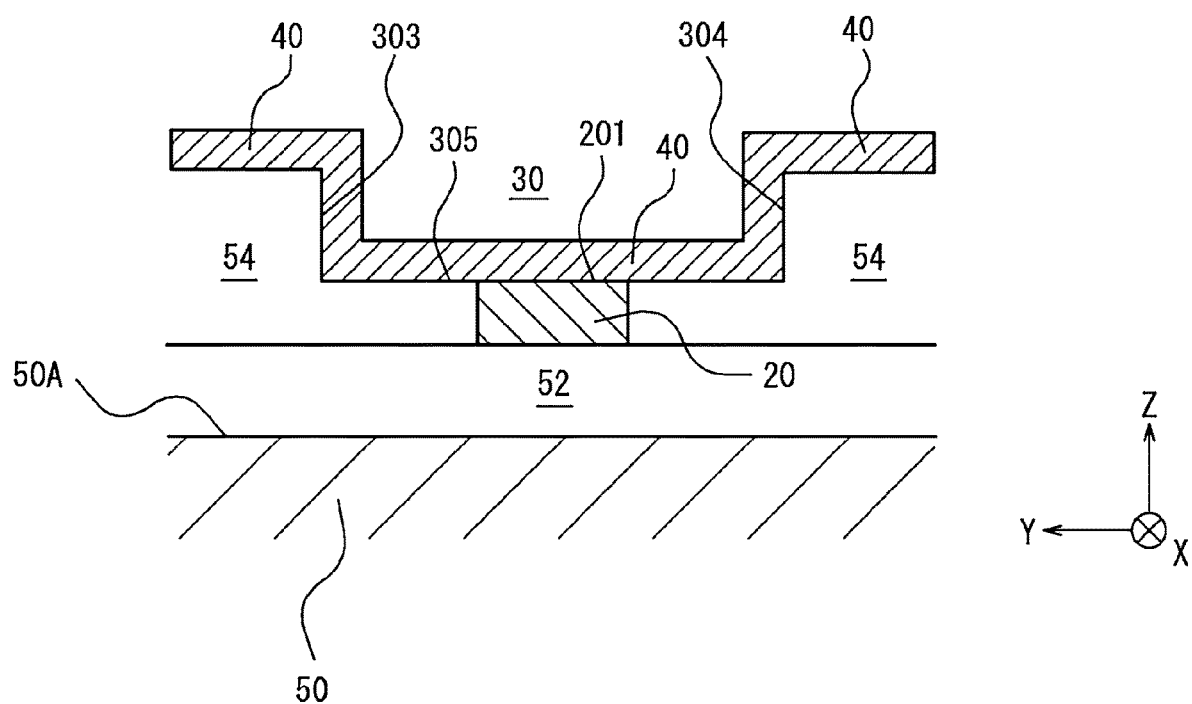
FIG. 4 is a sectional view illustrating an example of a configuration in which a non-reciprocity member is in contact with entire side surfaces of the recess.

The non-reciprocity member 40 is positioned in contact with at least part of the bottom surface 305 of the recess 30. The non-reciprocity member 40 may contact the entirety of the bottom surface 305 or part of the bottom surface 305. The non-reciprocity member 40 may contact at least part of each of the side surfaces 301, 302, 303, and 304 that are continuously joined to the bottom surface 305 of the recess 30. Stated another way, the non-reciprocity member 40 may contact not only the bottom surface 305 of the recess 30, but also at least part of the side surface 301, at least part of the side surface 302, at least part of the side surface 303, and at least part of the side surface 304. The non-reciprocity member 40 may be positioned in contact with part of the side surfaces 301, 302, 303, and 304. In other words, the non-reciprocity member 40 does not need to contact any one of the side surfaces 301, 302, 303, and 304. The non-reciprocity member 40 may be positioned on the surface of the insulating layer 54 on the outer side of the recess 30. As illustrated in FIG. 4, the non-reciprocity member 40 may contact the entirety of the side surface 301 of the recess 30, the entirety of the side surface 302, the entirety of the side surface 303, and the entirety of the side surface 304 and may be positioned in a continuous form extending entirely over a region from the bottom surface 305 to the surface of the insulating layer 54. When the upper surface 201 of the waveguide 20 is flush with the bottom surface 305 of the recess 30, the non-reciprocity member 40 contacts at least part of the upper surface 201 of the waveguide 20. The non-reciprocity member 40 may be formed by forming a film in the recess 30.

The recess 30 may overlap at least part of the waveguide 20 in a width direction intersecting the extension direction of the waveguide 20 in the plan view of the substrate surface 50A. The recess 30 may overlap part of the waveguide 20 in the width direction in the plan view of the substrate surface 50A. The recess 30 may overlap the entirety of the waveguide 20 in the width direction in the plan view of the substrate surface 50A.

The non-reciprocity member 40 may overlap at least part of the waveguide 20 in the width direction within a range of the bottom surface 305 of the recess 30. The non-reciprocity member 40 may overlap part of the waveguide 20 in the width direction within the range of the bottom surface 305 of the recess 30. The non-reciprocity member 40 may overlap the entirety of the waveguide 20 in the width direction within the range of the bottom surface 305 of the recess 30.

The non-reciprocity member 40 may overlap at least part of the waveguide 20 in the extension direction within the range of the bottom surface 305 of the recess 30. The non-reciprocity member 40 may overlap part of the waveguide 20 in the extension direction within the range of the bottom surface 305 of the recess 30. The non-reciprocity member 40 may overlap the entirety of the waveguide 20 in the extension direction within the range of the bottom surface 305 of the recess 30.

The waveguide 20 is surrounded by the box layer 52, the insulating layer 54, and the non-reciprocity member 40. The waveguide 20 is also referred to as a core. The box layer 52 and the insulating layer 54 are also referred to as a cladding. The core and the cladding may include a dielectric. The waveguide 20 is also referred to as a dielectric line. Materials of the core and the cladding are selected such that a relative permittivity of the core is greater than that of the cladding. Stated another way, the materials of the core and the cladding are selected such that a refractive index of the cladding is greater than that of the core. Such a selection enables an electromagnetic wave propagating in the core to be totally reflected at a boundary between the core and the cladding. As a result, loss of the electromagnetic wave propagating through the core can be reduced.

The relative dielectric constant of each of the core and the cladding may be set to be greater than that of air. With the relative dielectric constant of each of the core and the cladding being greater than that of air, leakage of the electromagnetic wave from the isolator 10 can be suppressed. As a result, loss caused by radiation of the electromagnetic wave to the outside from the isolator 10 can be reduced.

In this embodiment, a material of the waveguide 20 serving as the core is silicon (Si). However, the material of the core is not limited to the above example, and various other materials may also be used. Materials of the box layer 52 and the insulating layer 54 serving as the cladding are quartz glass or a silicon oxide film ($SiO_2$). However, the material of the cladding is not limited to the above examples, and various other materials may also be used. The relative dielectric constants of silicon and quartz glass are respectively about 12 and about 2. Silicon can propagate an electromagnetic wave of a near infrared wavelength ranging from about 1.2 µm to about 6 µm with low loss. When the waveguide 20 is made of silicon, the waveguide 20 can propagate an electromagnetic wave of a wavelength in a 1.3 µm band or a 1.55 µm band, each used in optical communication, with low loss.

In this embodiment, Ce:YIG (cerium-substituted yttrium iron garnet) is used as a material of the non-reciprocity member 40. A transparent magnetic material, represented by a partly-substituted material of YIG, such as Bi:YIG (bismuth-substituted YIG), may also be used as the material of the non-reciprocity member 40. Moreover, a ferromagnetic material, such as FeCo, FeNi, or CoPt, a substance containing a ferromagnetic material, or the like may be used as the material of the non-reciprocity member 40. A dielectric containing magnetic nanoparticles in composite form, for example, a nanogranular material, may be used as the material of the non-reciprocity member 40. The materials of the non-reciprocity member 40 are not limited to the above examples, and various other magnetic materials may be further used as the non-reciprocity member 40.

The YIG-based non-reciprocity member 40 develops sufficient non-reciprocity with sufficient progress of crystallization. The crystallization of the non-reciprocity member 40 is progressed by heating the non-reciprocity member 40 to a predetermined temperature or higher. In consideration of influences upon other components, such as the waveguides and wirings, formed on the substrate 50, however, it is difficult to heat the entirety of the substrate 50 to the predetermined temperature or higher in a film formation process for the non-reciprocity member 40. Accordingly, the non-reciprocity member 40 formed in the recess 30 with the film formation process executed in a non-heated state of the substrate 50 is not crystallized sufficiently and cannot develop the sufficient non-reciprocity if used as is.

Thus, in the isolator 10 according to this embodiment, the non-reciprocity member 40 is heated by irradiation with laser light to crystallize the non-reciprocity member 40. Light of a wavelength at which light absorption efficiency of the non-reciprocity member 40 is high is used as the laser light. When the non-reciprocity member 40 is made of Ce:YIG, the absorption efficiency for visible light is high. Accordingly, a visible light laser may be used for the heating.

The laser light spreads over a finite range at an irradiation point due to optical limitation. An irradiation range of the laser light is wider than a width of the recess 30. A contribution, upon the crystallization, of the laser light applied to a region other than the non-reciprocity member 40 in the recess 30 is small. According to this embodiment, therefore, the isolator 10 may further include a mask for reducing transmittance of the laser light in a region other than the recess 30. The mask is formed such that the transmittance of the laser light is less than a transmission threshold, or that reflectance of the laser light is equal to or higher than a reflection threshold. For example, metal, such as aluminum, may be used as a material of the mask. The material of the mask is not limited to the above example, and various other materials may also be used.

A laser-light absorbing member may be further formed on the non-reciprocity member 40 that is positioned in the recess 30. A material with high absorption efficiency for the laser light is used as the absorbing member. A material with different absorption characteristics from the non-reciprocity member 40 may also be used. Carbon or the like with high absorption efficiency for infrared light may be used as the absorbing member.

In the isolator 10 according to this embodiment, as described above, the non-reciprocity member 40 is heated in manner of making the other components on the substrate 50 less affected. This can reduce the influences upon the semiconductor process even when the material needing heat treatment is used as the non-reciprocity member 40. In addition, the performance of the isolator 10 can be enhanced.

Other Examples of Configuration of Isolator 10

The isolator 10 is not limited to the above-described embodiment and may be constituted in various other embodiments. Other examples of the configuration of the isolator 10 will be described below.

<Height of Waveguide 20>

Figure 3:
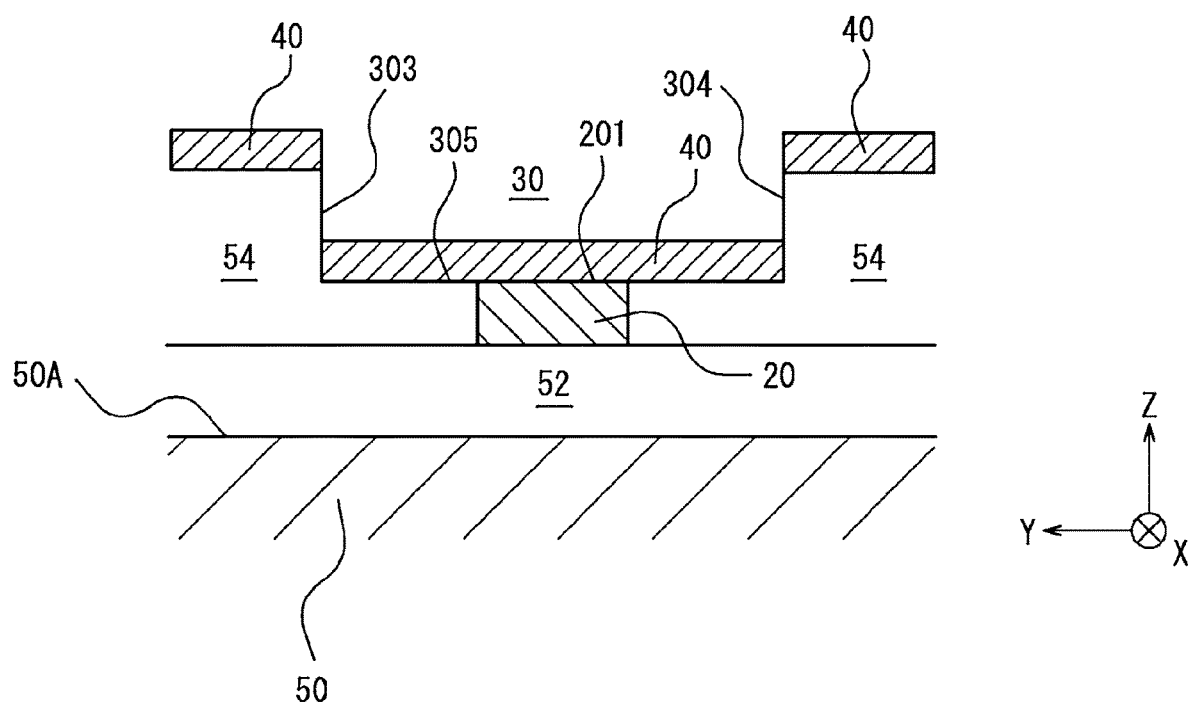
FIG. 3 is a sectional view taken along A-A in FIG. 2.

In the isolator 10 described above, the waveguide 20 may be constituted such that, as illustrated in FIG. 3, the upper surface 201 of the waveguide 20 is flush with the bottom surface 305 of the recess 30.

Figure 5:
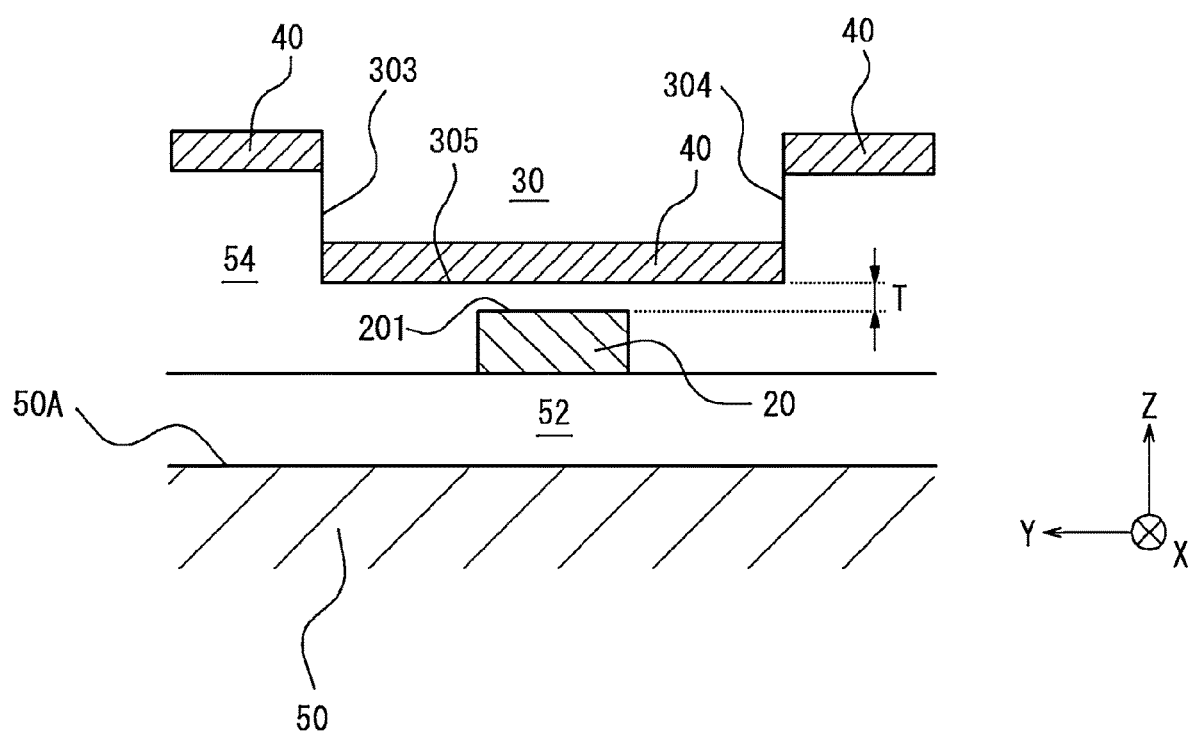
FIG. 5 is a sectional view illustrating an example of a configuration in which an insulating layer is present between an upper surface of the waveguide and a bottom surface of the recess.

In another example of the configuration, the waveguide 20 may be constituted such that, as illustrated in FIG. 5, the upper surface 201 of the waveguide 20 is positioned at a lower level than the bottom surface 305 of the recess 30. In this case, the upper surface 201 of the waveguide 20 is covered with the insulating layer 54. Accordingly, the non-reciprocity member 40 does not contact the waveguide 20. Stated another way, the insulating layer 54 is positioned between the upper surface 201 of the waveguide 20 and the non-reciprocity member 40. A thickness of the insulating layer 54 positioned between the upper surface 201 of the waveguide 20 and the non-reciprocity member 40 is expressed by T.

According to this embodiment, the non-reciprocity waveguide in the isolator 10 develops the non-reciprocity for the electromagnetic wave in the TM mode. In the case of the electromagnetic wave in the TM mode, as described above, when the electromagnetic wave propagates along the substrate 50, the amplitude direction of the electric field is aligned with the direction normal to the substrate surface 50A of the substrate 50. The non-reciprocity is developed with an electric field component being affected by the non-reciprocity member 40. Thus, in a cross-section along the extension direction of the waveguide 20, even when the non-reciprocity member 40 is away from the waveguide 20, the non-reciprocity waveguide develops the non-reciprocity due to spread of an energy distribution of the electric field in the direction normal to the substrate surface 50A, namely in a Z-axis direction, if the non-reciprocity member 40 is present within a predetermined range.

In this embodiment, the waveguide 20 has a rectangular cross-sectional shape. In this case, a mode field diameter is defined in the Z-direction, namely in the amplitude direction of the electric field of the electromagnetic wave in the TM mode. Energy of the electric field component of the electromagnetic wave in the TM mode propagating through the waveguide 20 reduces to a larger extent at a position farther away from the waveguide 20 toward the outer side. The magnitude of the energy of the electric field component of the electromagnetic wave in the TM mode outside the waveguide 20 varies according to the Gauss distribution. The mode field diameter in the Z-axis direction is defined as a distance up to a position at which the magnitude of the energy decreases to $1/e^2$ relative to the magnitude of the energy of the electric field component at the upper surface 201 of the waveguide 20. Stated another way, the energy is effectively distributed within a range where the magnitude of the energy is $1/e^2$ or more.

The mode field diameter in the Z-axis direction for the waveguide 20 is determined based on a length of the waveguide 20 in a width direction in a cross-section orthogonal to the extension direction of the waveguide 20, a length of the waveguide 20 in the Z-axis direction, namely a height of the waveguide 20, a refractive index of the waveguide 20, a refractive index of the insulating layer 54, and a wavelength of the electromagnetic wave propagating through the waveguide 20.

As the mode field diameter in the Z-axis direction increases, the energy distribution in the Z-axis direction of the electromagnetic wave propagating through the waveguide 20 widens. In more detail, when the thickness (T) of the insulating layer 54 positioned between the upper surface 201 of the waveguide 20 and the non-reciprocity member 40 is equal to or less than ½ of a value resulting from subtracting the height of the waveguide 20 in its cross-section from the mode field diameter in the Z-axis direction, the effective distribution of the energy of the electromagnetic wave propagating through the waveguide 20 reaches the non-reciprocity member 40. A value corresponding to ½ of the value resulting from subtracting the height of the waveguide 20 in its cross-section from the mode field diameter in the Z-axis direction is also referred to as a thickness threshold. In other words, the thickness threshold is determined based on the mode field diameter for the waveguide 20 and the height of the waveguide 20 in its cross-section. Even when the insulating layer 54 is positioned between the upper surface 201 of the waveguide 20 and the non-reciprocity member 40, the non-reciprocity waveguide develops the non-reciprocity if the thickness (T) of the insulating layer 54 is equal to or smaller than the thickness threshold.

As an example, it is assumed that the following conditions are set.

Width of the waveguide 20: 400 nm
Height of the waveguide 20: 220 nm
Refractive index of the waveguide 20 (core): 3.45
Refractive index of the insulating layer 54 (cladding): 1.53
Wavelength of the electromagnetic wave in the TM mode propagating through the waveguide 20: 1550 nm Under the above conditions, the mode field diameter is 800 nm. The thickness threshold under the above conditions is 290 nm that is calculated as ½ of the value (800 nm-220 nm) resulting from subtracting the height of the waveguide 20 from the mode field diameter. Accordingly, the non-reciprocity waveguide develops the non-reciprocity when the thickness (T) of the insulating layer 54 positioned between the upper surface 201 of the waveguide 20 and the non-reciprocity member 40 is set to 290 nm or less. Stated another way, the non-reciprocity waveguide develops the non-reciprocity upon meeting that the non-reciprocity member 40 is present within a range of the mode field diameter for the waveguide 20 or that the non-reciprocity member 40 is in contact with the range of the mode field diameter for the waveguide 20.

As another example, it is assumed that the following conditions are set.

Width of the waveguide 20: 500 nm
Height of the waveguide 20: 220 nm
Refractive index of the waveguide 20 (core): 3.45
Refractive index of the insulating layer 54 (cladding): 1.53
Wavelength of the electromagnetic wave in the TM mode propagating through the waveguide 20: 1550 nm Under the above conditions, the mode field diameter is 520 nm. The thickness threshold under the above conditions is 150 nm that is calculated as ½ of the value (520 nm-220 nm) resulting from subtracting the height of the waveguide 20 from the mode field diameter. Accordingly, the non-reciprocity waveguide develops the non-reciprocity when the thickness (T) of the insulating layer 54 positioned between the upper surface 201 of the waveguide 20 and the non-reciprocity member 40 is set to 150 nm or less.

When a width and a height of the first waveguide 21 in its cross-section are the same as those of the second waveguide 22 in its cross-section, the mode field diameter in the Z-axis direction in the first waveguide 21 and the mode field diameter in the Z-axis direction in the second waveguide 22 are the same value. In this case, the thickness threshold for the first waveguide 21 and the thickness threshold for the second waveguide 22 are set to the same value.

When the width of the first waveguide 21 in its cross-section and the width of the second waveguide 22 in its cross-section are different, or when the height of the first waveguide 21 in its cross-section and the height of the second waveguide 22 in its cross-section are different, the mode field diameter in the Z-axis direction for the first waveguide 21 and the mode field diameter in the Z-axis direction for the second waveguide 22 may be different values. In this case, the thickness threshold for the first waveguide 21 and the thickness threshold for the second waveguide 22 may be set to different values.

As described above, even when the non-reciprocity member 40 is not in contact the waveguide 20, the non-reciprocity waveguide can develop the non-reciprocity. Stated another way, even in the case in which the upper surface 201 of the waveguide 20 is not exposed from the insulating layer 54 at the bottom surface 305 of the recess 30, the non-reciprocity waveguide can develop the non-reciprocity. Due to no necessity of making the upper surface 201 of the waveguide 20 exposed from the insulating layer 54, the upper surface 201 of the waveguide 20 is not exposed directly to gas for dry etching to form the recess 30. As a result, the upper surface 201 of the waveguide 20 is kept from being roughed by the dry etching.

If a damage generates in the upper surface 201 of the waveguide 20, the damage causes loss of the electromagnetic wave propagating through the waveguide 20 even with the damage being very small. In particular, because the amplitude direction of the electric field of the electromagnetic wave in the TM mode intersects the upper surface 201 of the waveguide 20, the damage of the upper surface 201 of the waveguide 20 tends to cause the loss of the electromagnetic wave in the TM mode. Thus, because of no necessity of making the upper surface 201 of the waveguide 20 exposed from the insulating layer 54, the upper surface 201 of the waveguide 20 is not damaged by the dry etching, and hence the loss of the electromagnetic wave propagating through the waveguide 20 is reduced.

Figure 6:
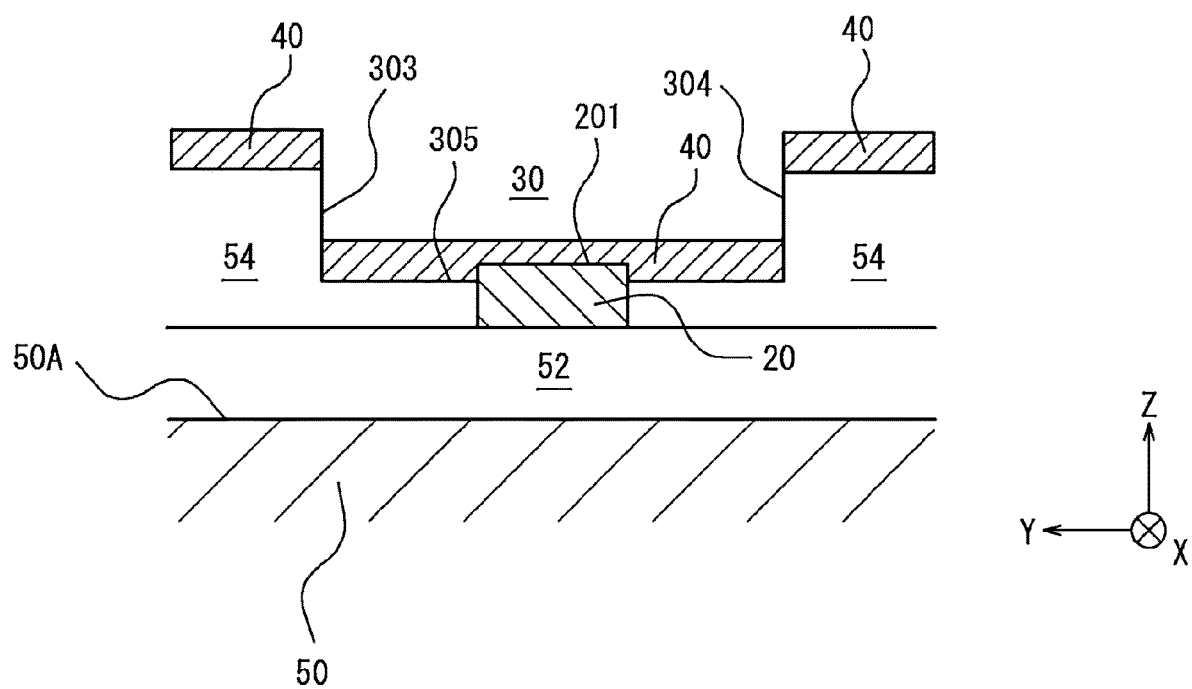
FIG. 6 is a sectional view illustrating an example of a configuration in which the bottom surface of the recess is lower than the upper surface of the waveguide.

In another example of the configuration, as illustrated in FIG. 6, the upper surface 201 of the waveguide 20 may be positioned at an upper level than the bottom surface 305 of the recess 30. A state in which the upper surface 201 of the waveguide 20 is positioned at an upper level than the bottom surface 305 of the recess 30 can be generated when, in forming the recess 30, the insulating layer 54 is over-etched under a condition that an etching rate for the insulating layer 54 is greater than that for the waveguide 20. In this case, the upper surface 201 of the waveguide 20 is not covered with the insulating layer 54 and is exposed. Accordingly, the non-reciprocity member 40 contacts the waveguide 20.

Stated another way, the first recess 31 may be constituted such that a position of the bottom surface 305 of the first recess 31 is lower than that of the upper surface 201 of the first waveguide 21 in a direction vertical to the substrate surface 50A. The second recess 32 may be constituted such that a position of the bottom surface 305 of the second recess 32 is lower than that of the upper surface 201 of the second waveguide 22 in the direction vertical to the substrate surface 50A.

When the bottom surface 305 of the recess 30 has a stepped level difference due to protrusion of the upper surface 201 of the waveguide 20 as illustrated in FIG. 6, the stepped level difference may affect the crystallization of the non-reciprocity member 40. When, for example, Ce:YIG is used as the non-reciprocity member 40, discontinuity of a Ce:YIG film at the stepped level difference may impede the crystallization in an annealing process to crystallize Ce:YIG. When Ce:YIG is used as the non-reciprocity member 40, the recess 30 may be formed while the stepped level difference in the bottom surface 305 is kept at 100 nm or less.

Shape of Recess

Figure 2:
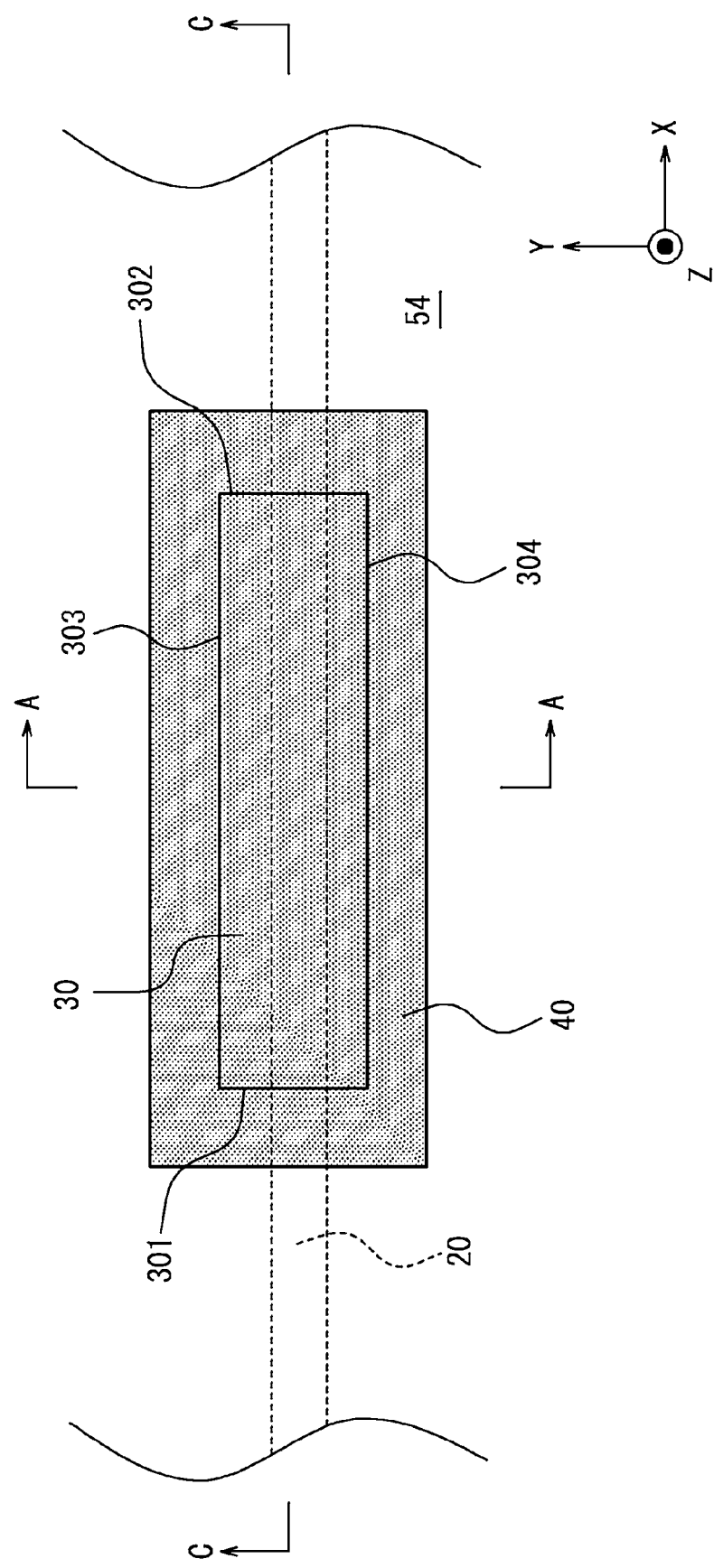
FIG. 2 is a plan view illustrating an example of a positional relation between a waveguide and a recess.
Figure 7:
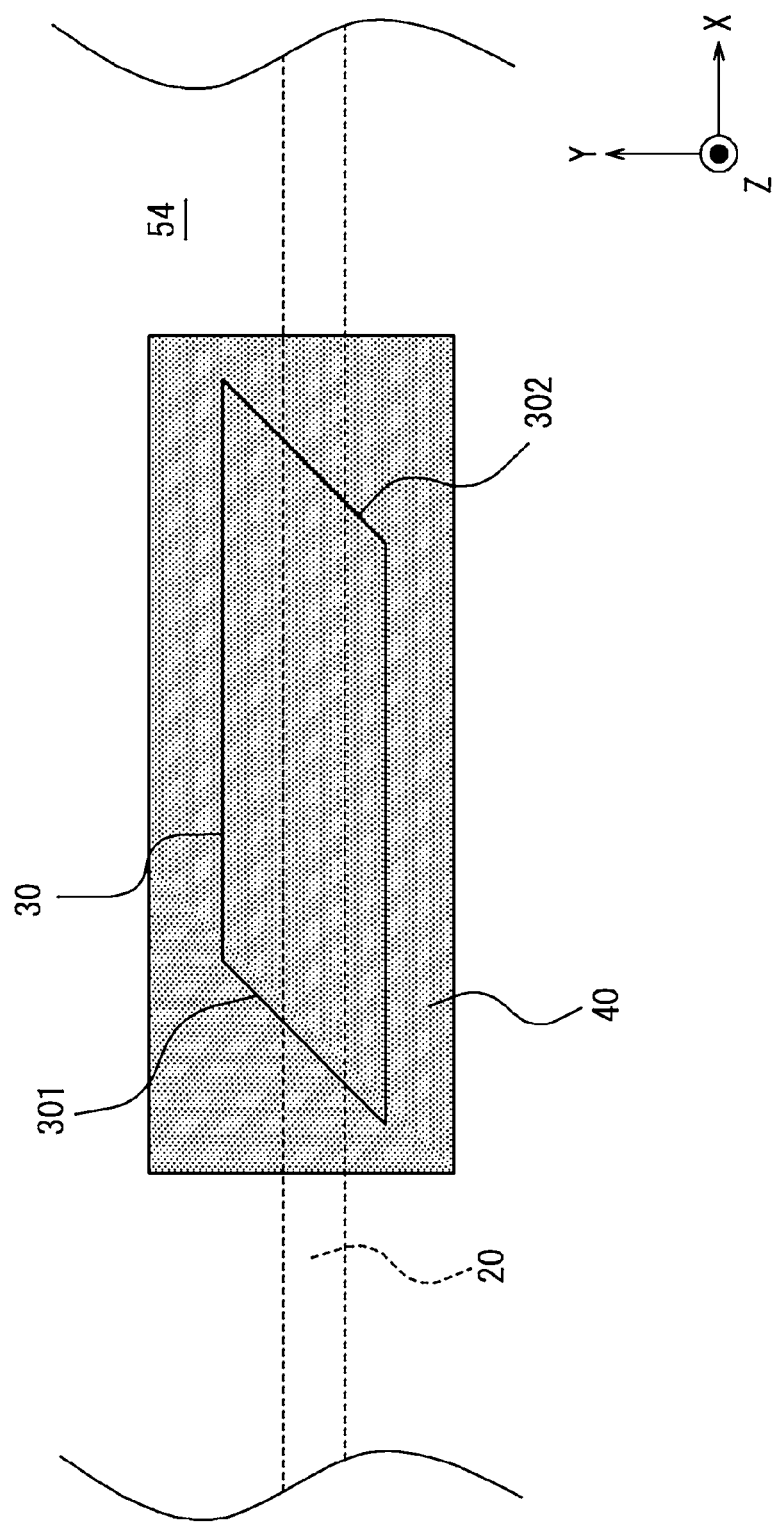
FIG. 7 is a plan view illustrating another example of a plan shape of the recess.

As illustrated in FIG. 2, the side surfaces 301 and 302 of the recess 30 may be orthogonal to the extension direction of the waveguide 20 in the plan view of the substrate surface 50A. In another example, as illustrated in FIG. 7, the side surfaces 301 and 302 may be inclined at an angle greater than 0 degree and smaller than 90 degrees relative to the direction orthogonal to the extension direction of the waveguide 20 in the plan view of the substrate surface 50A. Stated another way, of the side surfaces 301 to 304 defining the first recess 31, the side surfaces 301 and 302 positioned at ends of the first waveguide 21 in its extension direction may be inclined relative to a plane perpendicular to the extension direction of the first waveguide 21. Of the side surfaces 301 to 304 defining the second recess 32, the side surfaces 301 and 302 positioned at ends of the second waveguide 22 in its extension direction may be inclined relative to a plane perpendicular to the extension direction of the second waveguide 22.

Because the side surfaces 301 and 302 are inclined relative to the extension direction of the waveguide 20 in the plan view of the substrate surface 50A, an area where the non-reciprocity member 40 overlies the waveguide 20 decreases gradually toward a region of the waveguide 20 outside the recess 30 from a region thereof overlapping the recess 30. Hence the effective refractive index of the waveguide 20 changes moderately toward the region of the waveguide 20 outside the recess 30 from the region thereof overlapping the recess 30 than when the side surfaces 301 and 302 are orthogonal to the extension direction of the waveguide 20.

With the moderate change in the effective refractive index of the waveguide 20, the electromagnetic wave is less reflected at a boundary between the region of the waveguide 20 overlapping the recess 30 and the region thereof outside the recess 30. As a result, the loss of the electromagnetic wave in the isolator 10 is reduced.

Figure 8:
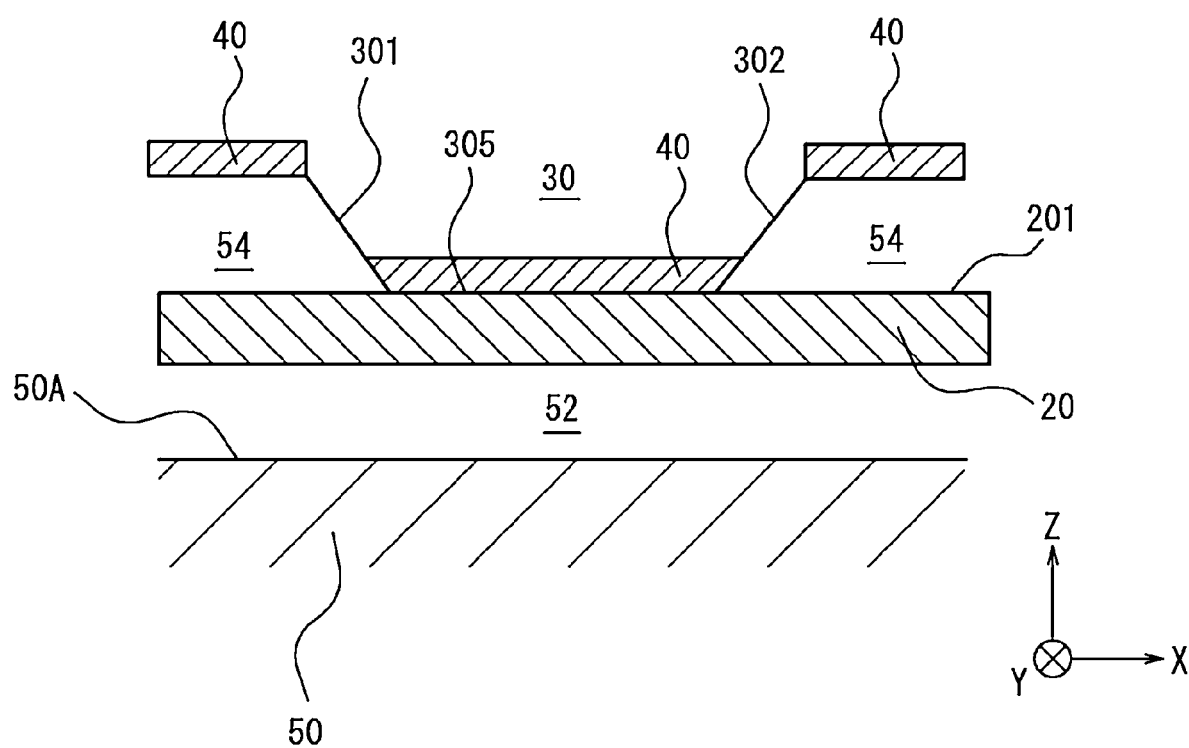
FIG. 8 is a sectional view illustrating another example of a sectional shape of the recess.

The side surfaces 301 and 302 of the recess 30 may be vertical to the substrate surface 50A in a cross-section vertical to the substrate surface 50A. In another example, as illustrated in FIG. 8, the side surfaces 301 and 302 may be inclined to gradually widen toward the outer side of the recess 30 while departing farther away from the bottom surface 305 upward in the cross-section vertical to the substrate surface 50A and along the extension direction of the waveguide 20. Stated another way, of the side surfaces 301 to 304 defining the first recess 31, the side surfaces 301 and 302 positioned at the ends in the extension direction of the first waveguide 21 may be inclined toward the outer side of the first recess 31 relative to the direction vertical to the substrate surface 50A. Of the side surfaces 301 to 304 defining the second recess 32, the side surfaces 301 and 302 positioned at the ends in the extension direction of the second waveguide 22 may be inclined toward the outer side of the second recess 32 relative to the direction vertical to the substrate surface 50A.

The non-reciprocity member 40 is positioned on the bottom surface 305 and extends up to regions over the side surfaces 301 and 302.

Because the side surfaces 301 and 302 are inclined to widen toward the outer side of the recess 30 in the cross-section of the recess 30 along the extension direction of the waveguide 20, a distance from the upper surface 201 of the waveguide 20 to the non-reciprocity member 40 increases gradually. Hence the effective refractive index of the waveguide 20 changes moderately toward the region of the waveguide 20 outside the recess 30 from the region thereof overlapping the recess 30 than when the side surfaces 301 and 302 rise vertically relative to the substrate surface 50A.

With the moderate change in the effective refractive index of the waveguide 20, the electromagnetic wave is less reflected at the boundary between the region of the waveguide 20 overlapping the recess 30 and the region thereof outside the recess 30. As a result, the loss of the electromagnetic wave in the isolator 10 is reduced.

<Examples of Arrangement of Waveguide 20 and Recess 30>

Arrangement of the waveguide 20 and the recess 30 is not limited to that illustrated in FIG. 1. Other examples of the arrangement of the waveguide 20 and the recess 30 will be described below.

As illustrated in FIG. 9, when the magnetic field (B) is applied along a line interconnecting the first branch portion 81 and the second branch portion 82, the isolator 10 may be constituted as follows. The first recess 31 overlaps a portion of the first waveguide 21, the portion extending in the up-down direction orthogonal to the magnetic field, and the second recess 32 overlaps a portion of the second waveguide 22, the portion extending in the up-down direction orthogonal to the magnetic field. The first non-reciprocity member is positioned over the entirety of the bottom surface 305 of the first recess 31. The second non-reciprocity member is positioned over the entirety of the bottom surface 305 of the second recess 32.

Furthermore, when the electromagnetic wave propagates in the first direction toward the second branch portion 82 from the first branch portion 81, a direction in which the electromagnetic wave in the first waveguide 21 propagates in the portion of the first waveguide 21 where the first recess 31 overlaps the first waveguide 21 is upward. A direction in which the electromagnetic wave in the second waveguide 22 propagates in the portion of the second waveguide 22 where the second recess 32 overlaps the second waveguide 22 is downward.

Thus, in the isolator 10 illustrated in FIG. 9, the propagation direction of the electromagnetic wave in the first waveguide 21 at a position where the first recess 31 overlaps the first waveguide 21 and the propagation direction of the electromagnetic wave in the second waveguide 22 at a position where the second recess 32 overlaps the second waveguide 22 are different from each other. As a result, in the isolator 10 illustrated in FIG. 9, the phase can be advanced or delayed in a different way between when the electromagnetic wave propagates in the first direction and when the electromagnetic wave propagates in the second direction. Moreover, in the isolator 10, D1 and D2 are equal to each other. As a result, the isolator 10 allows the passage of the electromagnetic wave propagating in the first direction but does not allow the passage of the electromagnetic wave propagating in the second direction.

As illustrated in FIG. 10, when the magnetic field (B) is applied along a direction in which the first branch portion 81 and the second branch portion 82 are interconnected, the isolator 10 may be constituted as follows. The first recess 31 overlaps a portion of the first waveguide 21, the portion extending in a direction inclined relative to the magnetic field, and the second recess 32 overlaps a portion of the second waveguide 22, the portion extending in a direction inclined relative to the magnetic field. The first non-reciprocity member is positioned over the entirety of the bottom surface 305 of the first recess 31. The second non-reciprocity member is positioned over the entirety of the bottom surface 305 of the second recess 32.

In the above case, the effective length of the non-reciprocity waveguide in combination of the first non-reciprocity member and the first waveguide 21 is a component of the distance through which the first recess 31 overlaps the first waveguide 21, the component being oriented in the direction orthogonal to the magnetic field, and it is expressed by D1. The effective length of the non-reciprocity waveguide in combination of the second non-reciprocity member and the second waveguide 22 is a component of the distance through which the second recess 32 overlaps the second waveguide 22, the component being oriented in the direction orthogonal to the magnetic field, and it is expressed by D2. In the isolator 10, D1 and D2 are equal to each other. As a result, the isolator 10 allows the passage of the electromagnetic wave propagating in the first direction but does not allow the passage of the electromagnetic wave propagating in the second direction.

Figure 11:
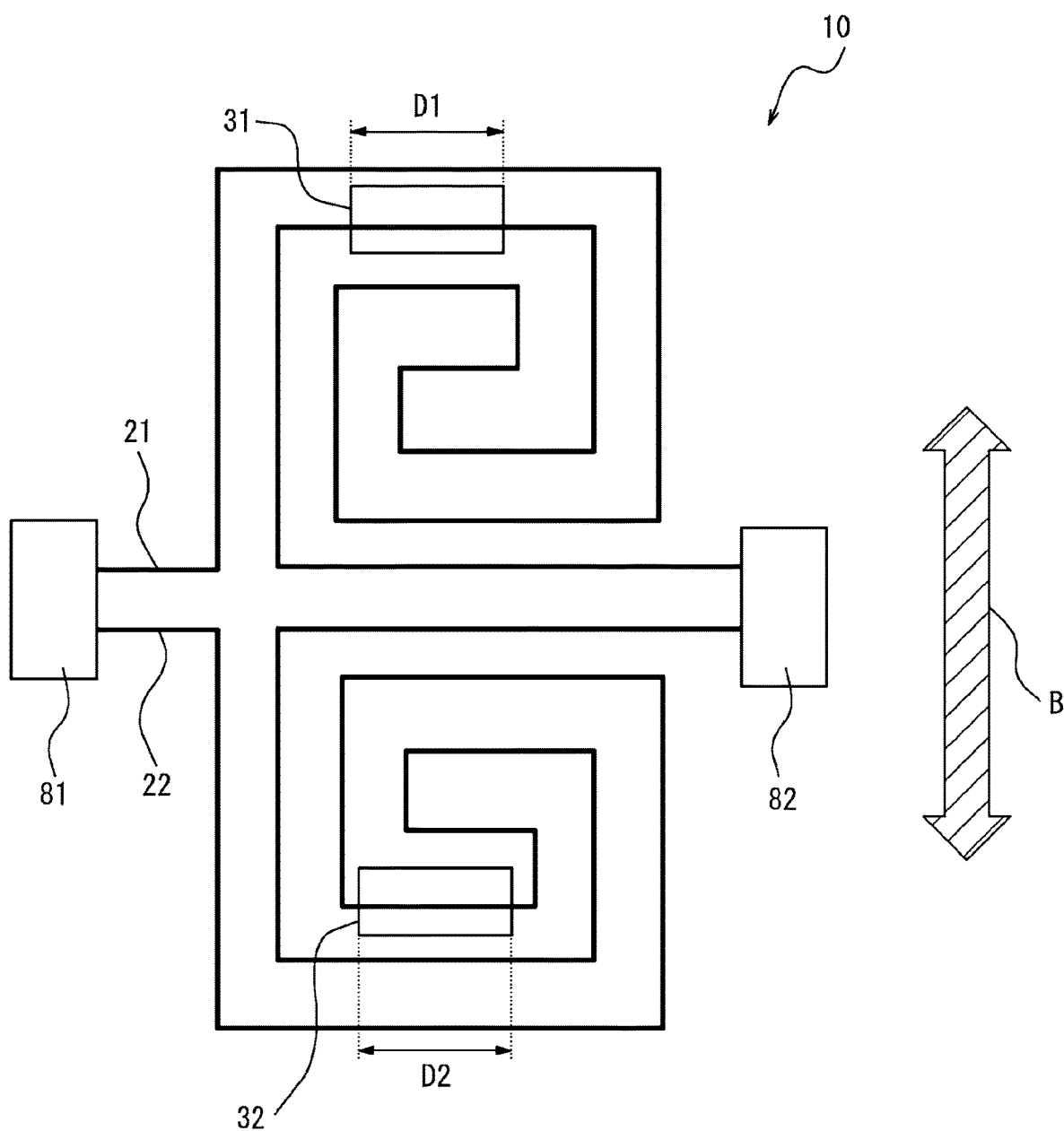
FIG. 11 is a plan view illustrating an example of a configuration in which the waveguides each have a spiral shape when a magnetic field is applied in a direction orthogonal to a direction interconnecting the first branch portion and the second branch portion.

As illustrated in FIGS. 11 and 12, the first waveguide 21 and the second waveguide 22 each may have a spiral shape. It is assumed that a length of the first waveguide 21 and a length of the second waveguide 22 between the first branch portion 81 and the second branch portion 82 are the same.

As illustrated in FIG. 11, when the magnetic field (B) is applied along a direction orthogonal to the direction in which the first branch portion 81 and the second branch portion 82 are interconnected, the isolator 10 may be constituted such that the first recess 31 overlaps a portion of the first waveguide 21, the portion extending in a left-right direction orthogonal to the magnetic field, and that the second recess 32 overlaps a portion of the second waveguide 22, the portion extending in the left-right direction orthogonal to the magnetic field.

As illustrated in FIG. 12, when the magnetic field (B) is applied along the direction in which the first branch portion 81 and the second branch portion 82 are interconnected, the isolator 10 may be constituted such that the first recess 31 overlaps a portion of the first waveguide 21, the portion extending in the up-down direction orthogonal to the magnetic field, and that the second recess 32 overlaps a portion of the second waveguide 22, the portion extending in the up-down direction orthogonal to the magnetic field.

In the arrangements of the waveguide 20 illustrated in FIGS. 11 and 12, D1 and D2 are equal to each other in the isolator 10 as in the above case. As a result, the isolator 10 allows the passage of the electromagnetic wave propagating in the first direction but does not allow the passage of the electromagnetic wave propagating in the second direction.

In the arrangements of the waveguide 20 illustrated in FIGS. 11 and 12, the recess 30 may be divided into multiple parts that are positioned separately. In this type of the isolator 10, a total of the effective lengths in individual parts of the first recess 31 and a total of the effective lengths in individual parts of the second recess 32 are set equal to each other. As a result, the isolator 10 allows the passage of the electromagnetic wave propagating in the first direction but does not allow the passage of the electromagnetic wave propagating in the second direction.

<Laser Light Irradiation Device 70>

Figure 13:
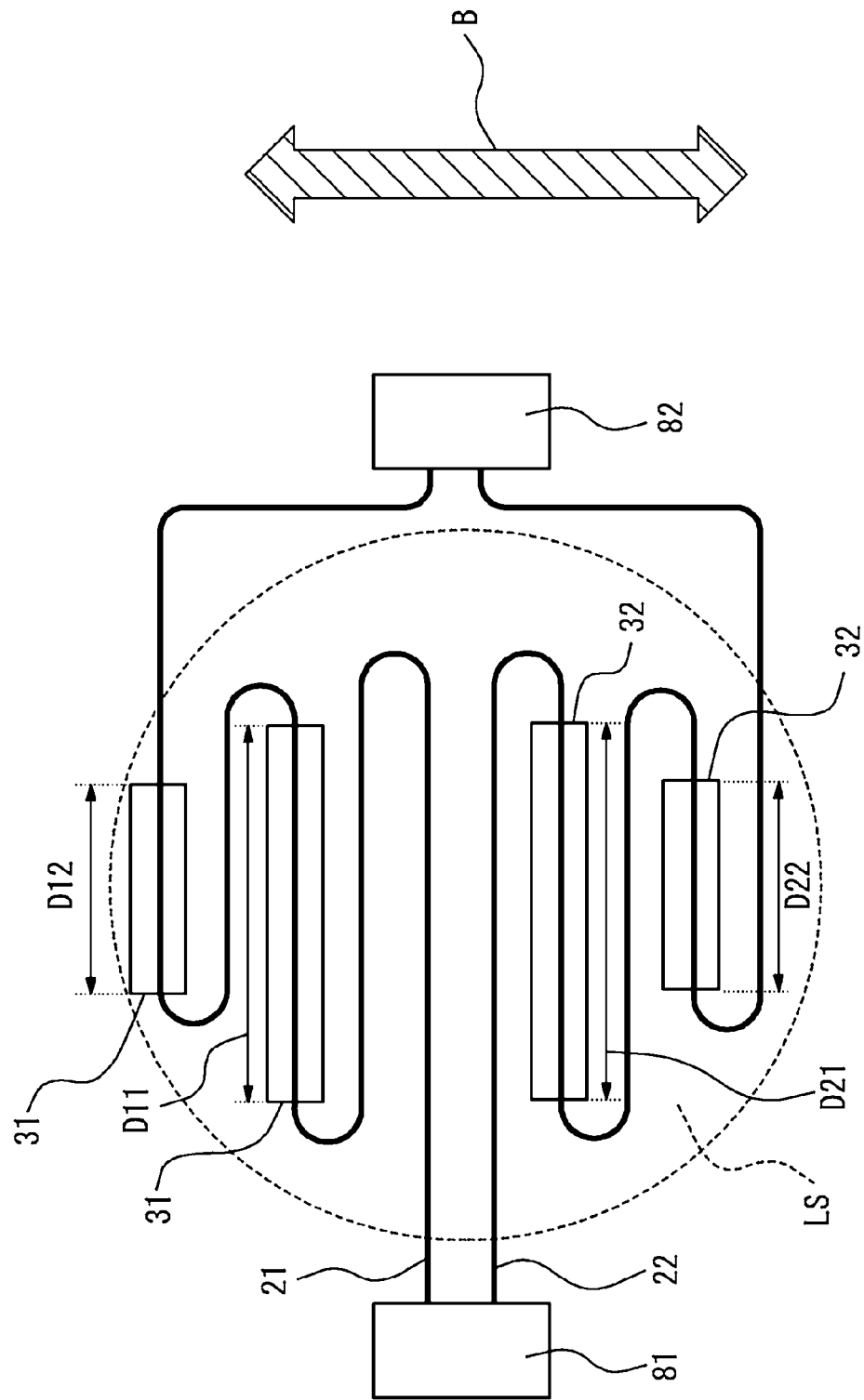
FIG. 13 is a plan view illustrating an example of a configuration in which the waveguides are positioned within a laser irradiation region of a substantially circular shape.

As illustrated in FIG. 13, the first waveguide 21 and the second waveguide 22 may be positioned within a laser irradiation region LS of a substantially circular shape. This arrangement enables laser light to be effectively utilized for heating of the non-reciprocity member 40. The first waveguide 21 and the second waveguide 22 may be arranged in a zigzag shape including multiple bent-back portions to be positioned within the laser irradiation region LS. Stated another way, the extension direction of the waveguide 20 may change in multiple portions. Other elements, such as an electronic circuit, mounted on and/or in the substrate 50 may be positioned outside the laser irradiation region LS. The above arrangement makes irradiation of the laser light less likely to affect the other elements.

In FIG. 13, the isolator 10 includes multiple first recesses 31 and multiple second recesses 32. Respective effective lengths of the first recesses 31 are expressed by D11 and D22. Respective effective lengths of the second recesses 31 are expressed by D21 and D22. The first recesses 31 and the second recesses 32 are formed such that the sum of D11 and D12 is equal to the sum of D21 and D22. As a result, the isolator 10 allows the passage of the electromagnetic wave propagating in the first direction but does not allow the passage of the electromagnetic wave propagating in the second direction.

Figure 14:
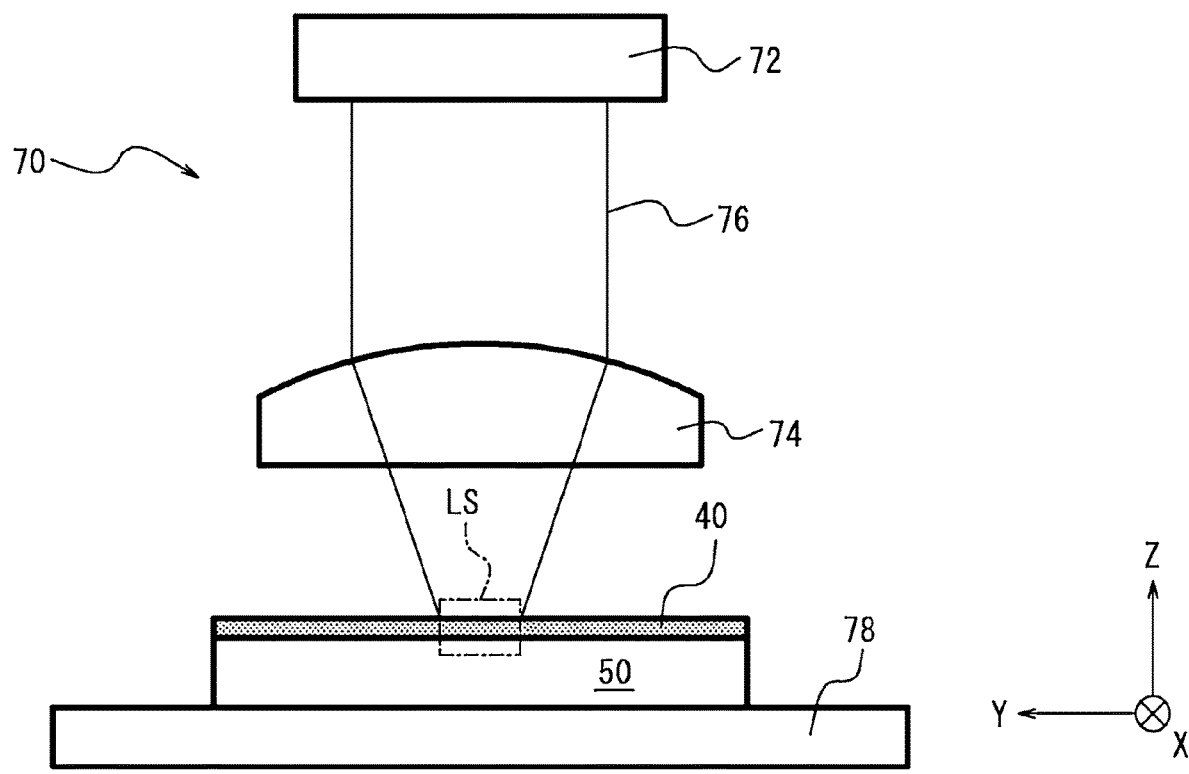
FIG. 14 is a side view illustrating an example of a configuration for laser irradiation.

In the isolator 10 according to this embodiment, as illustrated in FIG. 14, an irradiation device 70 may be used to irradiate the non-reciprocity member 40 with the laser light. The irradiation device 70 includes a laser light source 72, a lens 74, and a stage 78. The substrate 50 can be placed on the stage 78. The laser light source 72 emits laser light 76. The laser light 76 is focused by the lens 74. The focused laser light 76 enters the non-reciprocity member 40 on the substrate 50 placed on the stage 78 and heats the non-reciprocity member 40. A range irradiated with the laser light 76 on the substrate 50 is expressed by LS. The stage 78 can control a position of the substrate 50 along an XY-plane. The irradiation device 70 controls the irradiation range of the laser light 76 relative to the substrate 50 by controlling the position of the substrate 50 on the stage 78 and by controlling emission of the laser light 76 from the laser light source 72.

The laser light 76 may be a pulsed laser or a continuous oscillation laser (CW (continuous wave) oscillation laser). When the laser light 76 is a pulsed laser, a large amount of energy is applied to the non-reciprocity member 40 in a short time. This enables a temperature of the non-reciprocity member 40 to rise before heat escapes to the substrate 50. Hence the non-reciprocity member 40 is effectively heated. Conditions of the pulsed laser may be set, for example, as follows:

Wavelength: 532 nanometers (nm)
Scan speed: 100 micrometers per second (µm/s) to 10 millimeters per second (mm/s)
Diameter of the laser irradiation range (LS): 1 to 1000 micrometers (µm)
Average output power: 0.1 to 10 watts (W)

When the substrate 50 is heated in the atmosphere, the waveguide 20 or the other elements, such as the electric circuit, included in the substrate 50 may be oxidized. To avoid the elements included in the substrate 50 from being oxidized, the irradiation device 70 may further include a vacuum chamber for accommodating the stage 78 on which the substrate 50 is to be placed. The laser light source 72 or the lens 74 may be accommodated in the vacuum chamber or may be placed outside the vacuum chamber. When the laser light source 72 or the lens 74 is placed outside the vacuum chamber, the vacuum chamber may have a window through which the laser light 76 passes.

<Crystal Size of Non-Reciprocity Member 40>

Figure 15:
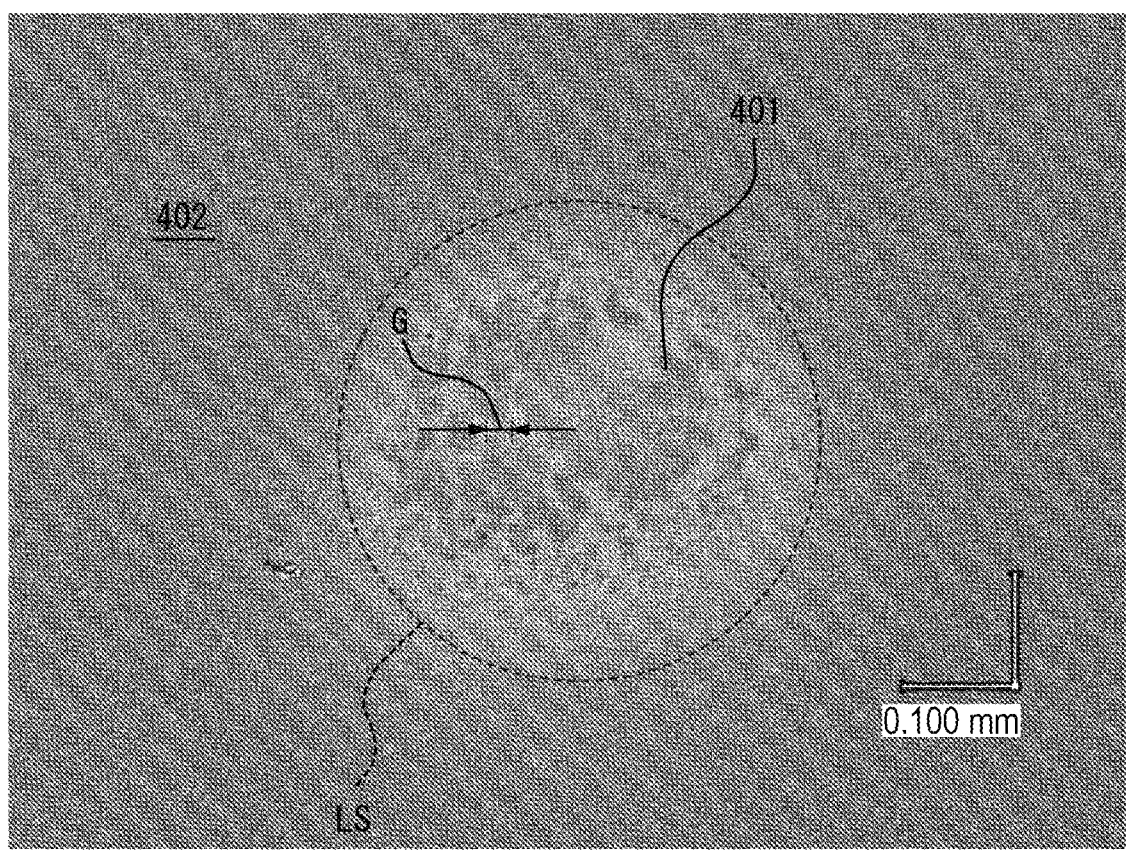
FIG. 15 illustrates an observation example for a surface of the non-reciprocity member that is crystallized with the laser irradiation.

A crystal of Ce:YIG used as the non-reciprocity member 40 can be observed as represented in FIG. 15. The range irradiated with the laser light 76 to crystalize Ce:YIG is a substantially circular range expressed by LS. A crystallized portion 401 in which Ce:YIG is crystallized is observed within the range expressed by LS. On the other hand, a non-crystallized portion 402 in which Ce:YIG is not crystallized is observed outside the range expressed by LS.

A size of each crystal in the crystallized portion 401 is measured and expressed by G, for example. In FIG. 15, the crystal size in a portion expressed by G is about 10 µm. The crystal size may be measured as a maximum size or a minimum size of the crystal. The crystal size may be measured as the diameter of a circle that approximately represents a shape of the crystal.

The sizes of individual crystals in the crystallized portion 401 have a distribution. The crystal sizes of most of the Ce:YIG crystals having been crystallized with the irradiation of the laser light 76 from the irradiation device 70 are distributed over a range from about 5 µm to about 20 µm. The crystal size in the entirety of the crystallized portion 401 may be calculated as a statistic value, such as an average, a median, or a maximum value, of the sizes of the crystals included in the crystallized portion 401.

Figure 16:
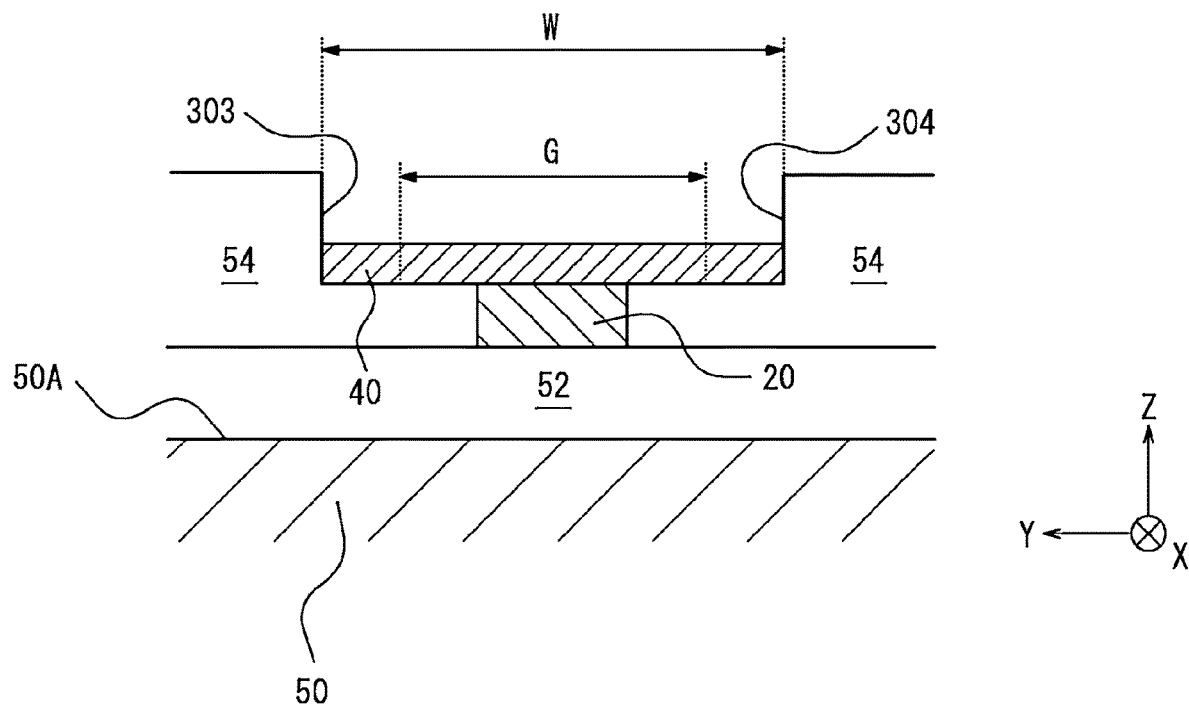
FIG. 16 is a sectional view illustrating an example of a relation between a crystal size of the non-reciprocity member and a width of the recess.

As illustrated in FIG. 16, a spacing between the side surface 303 and the side surface 304 both defining the recess 30 in the width direction is expressed by W. The crystal size when the non-reciprocity member 40 positioned in the recess 30 is crystallized is expressed by G. In the recess 30, the width (W) of the recess 30 may be longer than the crystal size (G). Stated another way, in the first recess 31, a length of the first recess 31 in the width direction of the first waveguide 21 may be longer than the crystal size of the first non-reciprocity member. In the second recess 32, a length of the second recess 32 in the width direction of the second waveguide 22 may be longer than the crystal size of the second non-reciprocity member.

When the width of the recess 30 is shorter than the crystal size, the non-reciprocity member 40 is more likely to be affected by the side surface 303 or 304 of the recess 30 when it is crystallized. The crystallization of the non-reciprocity member 40 may be impeded by the influence of the side surface 303 or 304. Stated conversely, when the width of the recess 30 is longer than the crystal size, the non-reciprocity member 40 is less likely to be affected by the side surface 303 or 304 of the recess 30 when it is crystallized. As a result, the crystallization of the non-reciprocity member 40 is promoted. The promotion of the crystallization of the non-reciprocity member 40 enhances the performance of the isolator 10.

To uniformly form a film of Ce:YIG on the bottom surface 305 of the recess 30 when the film of Ce:YIG is formed in the recess 30, the recess 30 may be formed such that a ratio of an opening width of the recess 30 at a height being flush with the surface of the insulating layer 54 to a depth of the recess 30 is 1 or more. In consideration of that the crystal size of Ce:YIG is distributed over a range of about 5 µm or more, the opening width of the recess 30 may be set to 5 µm or more.

<Adjustment with Heaters 61 and 62>

The phase of the electromagnetic wave propagating through the waveguide changes depending on a temperature of the waveguide as well. In the isolator 10, the temperature of the waveguide may be controlled to adjust the phase of the electromagnetic wave. As illustrated in FIG. 17, the isolator 10 may further include heaters 61 and 62 for controlling temperatures of respective parts of the first waveguide 21 and the second waveguide 22, respectively. The heater 61 can control a temperature of the part of the first waveguide 21. The heater 62 can control a temperature of the part of the second waveguide 22. With the above configuration, the isolator 10 can compensate for the phase by temperature control even when error generates in line lengths of the waveguides formed on the substrate 50. As a result, the performance of the isolator 10 can be enhanced.

In FIG. 17, the first waveguide 21 and the second waveguide 22 are bent 180 degrees in portions in which the heaters 61 and 62 are disposed. Curvature radii of the first waveguide 21 and the second waveguide 22 may be set such that the electromagnetic waves in the TM mode passing through those portions are not radiated.

<Filter>

In the isolator 10 according to this embodiment, the non-reciprocity waveguide in combination of the waveguide 20 and the non-reciprocity member 40 develops the non-reciprocity for the electromagnetic wave in the TM mode. Therefore, when the isolator 10 includes a portion for removing the electromagnetic wave in the TE mode, the electromagnetic wave in the TE mode can be avoided from propagating toward the first branch portion 81 from the second branch portion 82. The portion for removing the electromagnetic wave in the TE mode is also generally referred to as a filter. A directional coupler for causing the electromagnetic wave in the TE mode not to be coupled may be used as the filter.

<Method of Manufacturing Isolator 10>

An example of procedures of a method of manufacturing the isolator 10 according to this embodiment will be described below.

The waveguide 20 is formed on the box layer 52 of the substrate 50. The waveguide 20 may be formed in combination of a film forming step and an etching step. For example, plasma CVD (Chemical Vapor Deposition) or sputtering may be executed as the film forming step. For example, dry etching, such as RIE (Reactive Ion Etching), or wet etching may be performed the etching step.

The insulating layer 54 is formed on the waveguide 20. The insulating layer 54 may be formed by, for example, the plasma CVD. The recess 30 is formed in the insulating layer 54. The recess 30 may be formed by the dry etching.

The non-reciprocity member 40 is formed on the bottom surface 305 of the recess 30. The non-reciprocity member 40 may be formed as a film by, for example, the sputtering. The non-reciprocity member 40 is irradiated with the laser light. The non-reciprocity member 40 is heated by the irradiation with the laser light. A degree of the crystallization of the non-reciprocity member 40 is controlled by controlling the temperature of the non-reciprocity member 40 and a heating time.

The isolator 10 can be manufactured by performing the manufacturing method including the above-described example of the procedures. Even after completion of the isolator 10, characteristics of the isolator 10 can be adjusted by additionally applying the laser light after the completion of the isolator 10.

<Application Examples of Isolator 10>

The isolator 10 may be used in combination with a configuration for transmitting the electromagnetic wave. The isolator 10 may be applied to an optical switch, an optical transmitter and receiver, or a data center. The isolator 10 may be applied to, for example, an electromagnetic wave transmitter. The electromagnetic wave transmitter includes the isolator 10 and a light source. The electromagnetic wave transmitter receives the electromagnetic wave input to the isolator 10 from the light source and outputs the electromagnetic wave to a receiver from the isolator 10. The isolator 10 has a greater transmittance for the electromagnetic wave propagating from the light source to the receiver than for the electromagnetic wave propagating from the receiver to the light source. This makes the electromagnetic wave less likely to enter the light source. As a result, the light source can be protected.

The light source may be, for example, a semiconductor laser such as an LD (Laser Diode) or a VCSEL (Vertical Cavity Surface Emitting LASER). The light source may include a device for emitting not only visible light, but also electromagnetic waves of various wavelengths. The light source may be formed on the substrate 50 together with the isolator 10. The light source may emit the electromagnetic wave in the TM mode to be input to the isolator 10.

The electromagnetic wave transmitter may further include a modulator and a signal input unit. The modulator modulates the electromagnetic wave by changing intensity of the electromagnetic wave. The modulator may be positioned between the isolator 10 and the receiver instead of being positioned between the light source and the isolator 10. The modulator may perform, for example, pulse modulation of the electromagnetic wave. The signal input unit accepts an input of a signal from an external device or the like. The signal input unit may include, for example, a D/A (digital/analog) converter. The signal input unit outputs the signal to the modulator. The modulator modulates the electromagnetic wave in accordance with the signal received by the signal input unit.

The light source may include a modulator and a signal input unit. In this case, the light source may output a modulated electromagnetic wave to be input to the isolator 10.

The electromagnetic wave transmitter may be mounted on the substrate 50. The light source may be mounted and connected to the first branch portion 81 through the modulator. The light source may be mounted and connected to the first branch portion 81 not through the modulator. The receiver may be mounted and connected to the second branch portion 82 not through the modulator. The receiver may be mounted and connected to the second branch portion 82 through the modulator. In this case, the modulator may be mounted and connected to the second branch portion 82.

While the embodiment according to the present disclosure has been described with reference to the drawings and the examples, it is to be noted that those skilled in the art can variously vary or alter the embodiment on the basis of the present disclosure. Thus, it is to be noted that those variations or alterations also fall within the scope of the present disclosure. For example, unless there is no theoretical contradiction, the functions included in various components can be rearranged in such a manner as combining multiple components into one or dividing any of the components into multiple parts.

In the present disclosure, the words, such as "first" and "second", are used as identifiers to discriminate the components of interest. For the components discriminated by the words, such as "first" and "second", in the present disclosure, the numbers assigned to those components can be exchanged. For example, the identifier used in the first waveguide 21, namely "first", can be exchanged with that used in the second waveguide 22, namely "second". The identifiers are exchanged at the same time. Even after the exchange of the identifiers, the components of interest are discriminated as before the exchange. The identifiers may be deleted. The components from which the identifiers are deleted are discriminated by reference sings. The expression of the identifiers, such as "first" and "second", in the present disclosure is not to be regarded as, only from the use of that expression, specifying the order of the components of interest or indicating the grounds for the presence of the identifiers assigned with small numbers.

In the present disclosure, the X-axis, the Y-axis, and the Z-axis are set for convenience of explanation and may be replaced with one another. The components in the present disclosure have been described by using an orthogonal coordinate system with the X-axis, the Y-axis, and the Z-axis. A positional relation among the components in the present disclosure is not limited to the orthogonal relation.

In an embodiment, (1) an isolator includes a substrate with a substrate surface; a first waveguide and a second waveguide each extending on the substrate surface and causing an electromagnetic wave in a TM mode to propagate therethrough along an extension direction; an insulating layer positioned on the substrate surface and surrounding at least part of each of the first waveguide and the second waveguide; and a first non-reciprocity member and a second non-reciprocity member. The insulating layer has a surface positioned at an upper level than upper surfaces of the first waveguide and the second waveguide and includes a first recess and a second recess. The first recess is defined by a bottom surface positioned at a lower level than the surface of the insulating layer and by side surfaces positioned between the bottom surface and the surface of the insulating layer and overlaps at least part of the first waveguide in a plan view of the substrate surface. The second recess is defined by a bottom surface positioned at a lower level than the surface of the insulating layer and by side surfaces positioned between the bottom surface and the surface of the insulating layer and overlaps at least part of the second waveguide in the plan view of the substrate surface. The first non-reciprocity member is positioned on the bottom surface of the first recess and overlaps at least part of the first waveguide in the plan view of the substrate surface. The second non-reciprocity member is positioned on the bottom surface of the second recess and overlaps at least part of the second waveguide in the plan view of the substrate surface. A propagation direction of the electromagnetic wave in a portion of the first waveguide, the portion overlapping the first non-reciprocity member in the plan view of the substrate surface, and a propagation direction of the electromagnetic wave in a portion of the second waveguide, the portion overlapping the second non-reciprocity member in the plan view of the substrate surface, are different from each other.

(2) In the isolator according to above (1), at least part of the upper surface of the first waveguide may be in contact with the first non-reciprocity member. At least part of the upper surface of the second waveguide may be in contact with the second non-reciprocity member.

(3) In the isolator according to above (1) or (2), a position of the bottom surface of the first recess in a direction vertical to the substrate surface may be lower than a position of the upper surface of the first waveguide. A position of the bottom surface of the second recess in the direction vertical to the substrate surface may be lower than a position of the upper surface of the second waveguide.

(4) In the isolator according to above (1), the insulating layer may be positioned between the upper surface of the first waveguide and the first non-reciprocity member. The insulating layer may be positioned between the upper surface of the second waveguide and the second non-reciprocity member.

(5) In the isolator according to above (4), a thickness of the insulating layer positioned between the upper surface of the first waveguide and the first non-reciprocity member and a thickness of the insulating layer positioned between the upper surface of the second waveguide and the second non-reciprocity member may be respectively equal to or less than values that are determined based on mode field diameters for the first waveguide and the second waveguide in a direction vertical to the substrate surface and on heights of the first waveguide and the second waveguide in cross-sections thereof.

(6) In the isolator according to any one of above (1) to (5), a length of the first recess in a width direction of the first waveguide may be longer than a crystal size of the first non-reciprocity member. A length of the second recess in a width direction of the second waveguide may be longer than a crystal size of the second non-reciprocity member.

(7) In the isolator according to any one of above (1) to (6), the first non-reciprocity member and the second non-reciprocity member may contain YIG (yttrium iron garnet).

(8) In the isolator according to any one of above (1) to (7), of the side surfaces defining the first recess, the side surfaces positioned at ends of the first waveguide in the extension direction thereof may be inclined relative to a plane perpendicular to the extension direction of the first waveguide. Of the side surfaces defining the second recess, the side surfaces positioned at ends of the second waveguide in the extension direction thereof may be inclined relative to the plane perpendicular to the extension direction of the second waveguide.

(9) In the isolator according to any one of above (1) to (8), of the side surfaces defining the first recess, the side surfaces positioned at ends of the first waveguide in the extension direction thereof may be inclined toward an outer side of the first recess relative to the direction vertical to the substrate surface. Of the side surfaces defining the second recess, the side surfaces positioned at ends of the second waveguide in the extension direction thereof may be inclined toward an outer side of the second recess relative to the direction vertical to the substrate surface.

(10) In the isolator according to any one of above (1) to (9), the first waveguide and the second waveguide may be positioned within a substantially circular range in the plan view of the substrate surface.

(11) In the isolator according to any one of above (1) to (10), a distance through which the first waveguide overlaps the first non-reciprocity member and a distance through which the second waveguide overlaps the second non-reciprocity member may be equal to each other.

(12) The isolator according to any one of above (1) to (11) may further include a heater arranged to control a temperature of each of the first waveguide and the second waveguide.

In an embodiment, (13) an optical switch includes the isolator according to any one of above (1) to (12).

In an embodiment, (14) an optical transmitter and receiver includes the isolator according to any one of above (1) to (12) and a light source optically connected to the isolator.

In an embodiment, (15) a data center is configured to perform communication by a device including the isolator according to any one of above (1) to (12).

In an embodiment, (16) an isolator manufacturing method includes forming, on a substrate, a first waveguide and a second waveguide through each of which an electromagnetic wave in a TM mode propagates, forming an insulating layer on the first waveguide and the second waveguide, etching the insulating layer and forming a first recess overlapping at least a portion of the first waveguide and a second recess overlapping at least a portion of the second waveguide such that a propagation direction of the electromagnetic wave in the portion of the first waveguide overlapping the first recess and a propagation direction of the electromagnetic wave in the portion of the second waveguide overlapping the second recess are different from each other, forming a first non-reciprocity member on a bottom surface of the first recess, forming a second non-reciprocity member on a bottom surface of the second recess, and irradiating the first non-reciprocity member and the second non-reciprocity member with laser light.

REFERENCE SIGNS 10 isolator
20 waveguide (201: upper surface, 21: first waveguide, 22: second waveguide, 211, 212, 221, 222: turnaround portion)
30 recess (301, 302, 303, 304: side surface, 305: bottom surface, 31: first recess, 32: second recess)
40 non-reciprocity member
50 substrate (50A: substrate surface, 52: box layer, 54: insulating layer)
61, 62 heater
70 irradiation device (72: light source, 74: lens, 76: laser light, 78: stage)
81 first branch portion
82 second branch portion
LS laser irradiation range

The invention claimed is:

1. An isolator comprising:
a substrate with a substrate surface;
a first branch portion and a second branch portion positioned on the substrate surface;
a first waveguide and a second waveguide each extending, between the first branch portion and the second branch portion, on the substrate surface, causing an electromagnetic wave in a TM mode, which is branched by the first branch portion, to propagate therethrough along an extension direction in a first direction and causing the electromagnetic wave in the TM mode, which is branched by the second branch portion, to propagate therethrough along an extension direction in a second direction, wherein
an amplitude direction of an electric field of the electromagnetic wave in the TM mode is aligned with a direction normal to the substrate surface,
the first direction is a direction from the first branch portion to the second branch portion, and
the second direction is a direction from the second branch portion to the first branch portion;
an insulating layer positioned on the substrate surface and surrounding at least part of each of the first waveguide and the second waveguide; and
a first non-reciprocity member and a second non-reciprocity member,
wherein the insulating layer has a surface positioned above an upper surface of the first waveguide and an upper surface of the second waveguide, the insulating layer including a first recess and a second recess,
the first recess is defined by a bottom surface positioned lower than the surface of the insulating layer and by side surfaces positioned between the bottom surface and the surface of the insulating layer the first recess overlapping at least part of the first waveguide in a plan view of the substrate surface,
the second recess is defined by a bottom surface positioned lower than the surface of the insulating layer and by side surfaces positioned between the bottom surface and the surface of the insulating layer the second recess overlapping at least part of the second waveguide in the plan view of the substrate surface,
the first non-reciprocity member is positioned on the bottom surface of the first recess and overlaps at least part of the first waveguide in the plan view of the substrate surface,
the second non-reciprocity member is positioned on the bottom surface of the second recess and overlaps at least part of the second waveguide in the plan view of the substrate surface,
a propagation direction of the electromagnetic wave in a portion of the first waveguide, the portion overlapping the first non-reciprocity member in the plan view of the substrate surface, and a propagation direction of the electromagnetic wave in a portion of the second waveguide, the portion overlapping the second non-reciprocity member in the plan view of the substrate surface, are different from each other, and
the isolator is configured to allow passage of the electromagnetic wave in the TM mode in the first direction but not to allow passage of the electromagnetic wave in the TM mode in the second direction.

2. The isolator according to claim 1,
wherein at least part of the upper surface of the first waveguide is in contact with the first non-reciprocity member, and
at least part of the upper surface of the second waveguide is in contact with the second non-reciprocity member.

3. The isolator according to claim 1,
wherein a position of the bottom surface of the first recess in a direction vertical to the substrate surface is lower than a position of the upper surface of the first waveguide, and a position of the bottom surface of the second recess in the direction vertical to the substrate surface is lower than a position of the upper surface of the second waveguide.

4. The isolator according to claim 1,
wherein the insulating layer is positioned between the upper surface of the first waveguide and the first non-reciprocity member, and
the insulating layer is positioned between the upper surface of the second waveguide and the second non-reciprocity member.

5. The isolator according to claim 4, wherein a thickness of the insulating layer positioned between the upper surface of the first waveguide and the first non-reciprocity member and a thickness of the insulating layer positioned between the upper surface of the second waveguide and the second non-reciprocity member are respectively less than ½ of values resulting from subtracting heights of the first waveguide and the second waveguide in cross-sections thereof from mode field diameters for the first waveguide and the second waveguide in a direction vertical to the substrate surface.

6. The isolator according to claim 1,
wherein a length of the first recess in a width direction of the first waveguide is longer than a crystal size of the first non-reciprocity member, and
a length of the second recess in a width direction of the second waveguide is longer than a crystal size of the second non-reciprocity member.

7. The isolator according to claim 1, wherein the first non-reciprocity member and the second non-reciprocity member contain YIG (yttrium iron garnet).

8. The isolator according to claim 1,
wherein, of the side surfaces defining the first recess, the side surfaces positioned at ends of the first waveguide in an extension direction thereof are inclined relative to a plane perpendicular to the extension direction of the first waveguide, and
of the side surfaces defining the second recess, the side surfaces positioned at ends of the second waveguide in an extension direction thereof are inclined relative to the plane perpendicular to the extension direction of the second waveguide.

9. The isolator according to claim 1,
wherein, of the side surfaces defining the first recess, the side surfaces positioned at ends of the first waveguide in an extension direction thereof are inclined toward an outer side of the first recess relative to the direction vertical to the substrate surface, and
of the side surfaces defining the second recess, the side surfaces positioned at ends of the second waveguide in an extension direction thereof are inclined toward an outer side of the second recess relative to the direction vertical to the substrate surface.

10. The isolator according to claim 1, wherein the first waveguide and the second waveguide are positioned within a substantially circular region in the plan view of the substrate surface.

11. The isolator according to claim 1, wherein a distance through which the first waveguide overlaps the first non-reciprocity member and a distance through which the second waveguide overlaps the second non-reciprocity member are equal to each other.

12. The isolator according to claim 1, further comprising a heater arranged to control a temperature of each of the first waveguide and the second waveguide.

13. An optical switch comprising:
the isolator according to claim 1.

14. An optical transmitter and receiver comprising:
the isolator according to claim 1; and
a light source optically connected to the isolator.

15. A data center configured to perform communication by a device comprising the isolator according to claim 1.

16. A method for manufacturing an isolator comprising a first waveguide, a second waveguide, a first non-reciprocity member, a second non-reciprocity member, a first branch portion, and a second branch portion, comprising:
forming, on a substrate, the first waveguide and the second waveguide through each of which an electromagnetic wave in a TM mode propagates, wherein an amplitude direction of an electric field of the electromagnetic wave in the TM mode is aligned with a direction normal to the substrate surface, wherein
the first waveguide and the second waveguide each extends, between the first branch portion and the second branch portion, on the substrate surface, causes the electromagnetic wave in the TM mode, which is branched by the first branch portion, to propagate therethrough along an extension direction in a first direction, and causes the electromagnetic wave in the TM mode, which is branched by the second branch portion, to propagate therethrough along an extension direction in a second direction,
the first direction is a direction from the first branch portion to the second branch portion,
the second direction is a direction from the second branch portion to the first branch portion, and
the isolator is configured to allow passage of the electromagnetic wave in the TM mode in the first direction but not to allow passage of the electromagnetic wave in the TM mode in the second direction;
forming an insulating layer on the first waveguide and the second waveguide;
etching the insulating layer and forming a first recess overlapping at least a portion of the first waveguide and a second recess overlapping at least a portion of the second waveguide such that a propagation direction of the electromagnetic wave in the portion of the first waveguide overlapping the first recess and a propagation direction of the electromagnetic wave in the portion of the second waveguide overlapping the second recess are different from each other;
forming the first non-reciprocity member on a bottom surface of the first recess;
forming the second non-reciprocity member on a bottom surface of the second recess; and
irradiating the first non-reciprocity member and the second non-reciprocity member with laser light.

\* \* \* \* \*